US012307077B1

(12) United States Patent
Bolton

(10) Patent No.: US 12,307,077 B1
(45) Date of Patent: May 20, 2025

(54) TECHNIQUES FOR MANIPULATING COMPUTER-GENERATED OBJECTS IN A COMPUTER GRAPHICS EDITOR OR ENVIRONMENT

(71) Applicant: Apple Inc., Cupertino, CA (US)

(72) Inventor: Adam Bolton, La Pine, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/239,425

(22) Filed: Apr. 23, 2021

Related U.S. Application Data

(60) Provisional application No. 63/039,885, filed on Jun. 16, 2020.

(51) Int. Cl.
*G06F 3/04845* (2022.01)
*G06F 3/04815* (2022.01)
*G06F 3/04842* (2022.01)
*G06T 19/20* (2011.01)

(52) U.S. Cl.
CPC ...... *G06F 3/04845* (2013.01); *G06F 3/04815* (2013.01); *G06F 3/04842* (2013.01); *G06T 19/20* (2013.01); *G06T 2200/24* (2013.01); *G06T 2219/2016* (2013.01)

(58) Field of Classification Search
CPC ............ G06F 3/04845; G06F 3/04842; G06F 3/0484; G06F 3/04815; G06T 19/20; G06T 19/00; G06T 2200/24; G06T 2219/2016
USPC ................................................ 715/849, 848
See application file for complete search history.

(56) References Cited

U.S. PATENT DOCUMENTS

| | | | |
|---|---|---|---|
| 5,861,889 A | 1/1999 | Wallace et al. | |
| 6,128,631 A * | 10/2000 | Wallace | G06F 3/04845 345/473 |
| 6,308,144 B1 * | 10/2001 | Bronfeld | G06T 19/20 703/2 |
| 6,426,745 B1 | 7/2002 | Isaacs et al. | |
| 6,496,870 B1 | 12/2002 | Faustini | |
| 6,781,597 B1 | 8/2004 | Vrobel et al. | |
| 10,318,034 B1 * | 6/2019 | Hauenstein | G06F 3/0488 |
| 10,671,241 B1 * | 6/2020 | Jia | G06T 19/20 |
| 2001/0042118 A1 * | 11/2001 | Miyake | H04L 41/22 709/224 |
| 2002/0149628 A1 | 10/2002 | Smith et al. | |

(Continued)

OTHER PUBLICATIONS

Song et al., "A Handle Bar Metaphor for Virtual Object Manipulation with Mid-Air Interaction". CHI'12, May 5-10, 2012. (Year: 2012).*

(Continued)

*Primary Examiner* — Hwei-Min Lu
(74) *Attorney, Agent, or Firm* — Kubota & Basol LLP

(57) ABSTRACT

A computer generated 3D environment can include one or more free-space pins not permanently associated with any objects in the 3D environment. Objects in the 3D environment can be associated with one or more of the free-space pins, so that input at a selected free-space pin can cause manipulation of the objects associated with the selected free-space pin. For example, the selected free-space pin can be used as a temporary locus of manipulation (e.g., for rotation, movement, resizing, etc.) of the temporarily associated objects and/or can define a reference point for an action or behavior of one or more objects. A manipulator can be displayed when a free-space pin is selected to assist in receiving manipulation input.

24 Claims, 18 Drawing Sheets

(56) References Cited

U.S. PATENT DOCUMENTS

| | | | |
|---|---|---|---|
| 2003/0187532 A1* | 10/2003 | Charles | G06F 3/04815 706/45 |
| 2005/0108620 A1* | 5/2005 | Allyn | G06F 3/04842 715/255 |
| 2005/0188348 A1 | 8/2005 | Han et al. | |
| 2006/0025679 A1 | 2/2006 | Viswanathan et al. | |
| 2006/0041178 A1* | 2/2006 | Viswanathan | A61B 6/548 600/11 |
| 2007/0271524 A1* | 11/2007 | Chiu | G06F 16/44 715/767 |
| 2009/0079739 A1 | 3/2009 | Fitzmaurice et al. | |
| 2011/0041098 A1* | 2/2011 | Kajiya | G06F 3/04815 345/173 |
| 2012/0026100 A1* | 2/2012 | Migos | G06F 3/0412 345/173 |
| 2012/0078589 A1* | 3/2012 | McDaniel | G06F 3/04815 703/1 |
| 2012/0086719 A1* | 4/2012 | Brown | G06T 19/20 345/582 |
| 2012/0262458 A1* | 10/2012 | Fowler | G06T 19/00 345/427 |
| 2013/0093756 A1 | 4/2013 | Davidson | |
| 2013/0127833 A1 | 5/2013 | Davidson | |
| 2013/0135290 A1 | 5/2013 | Davidson | |
| 2013/0135291 A1 | 5/2013 | Davidson | |
| 2013/0318479 A1* | 11/2013 | Porwal | G06F 3/04815 715/849 |
| 2014/0040832 A1 | 2/2014 | Regelous | |
| 2014/0104266 A1* | 4/2014 | Stone | G06F 30/00 345/419 |
| 2014/0129990 A1* | 5/2014 | Xin | G06F 3/04815 715/849 |
| 2014/0149944 A1 | 5/2014 | Duplessis et al. | |
| 2014/0229871 A1 | 8/2014 | Tai et al. | |
| 2014/0344741 A1* | 11/2014 | Newman | G06F 3/04845 715/771 |
| 2016/0092080 A1* | 3/2016 | Swanson | G06F 3/04883 345/654 |
| 2017/0329488 A1 | 11/2017 | Welker et al. | |
| 2018/0113596 A1 | 4/2018 | Ptak et al. | |
| 2019/0294314 A1* | 9/2019 | Tada | G06V 20/20 |
| 2020/0082633 A1 | 3/2020 | Rom et al. | |
| 2020/0258193 A1 | 8/2020 | Katsumata | |
| 2020/0272303 A1 | 8/2020 | Jia et al. | |
| 2020/0319776 A1 | 10/2020 | Natzke | |
| 2020/0379626 A1 | 12/2020 | Guyomard et al. | |
| 2021/0134069 A1 | 5/2021 | Sorrento | |
| 2021/0150731 A1 | 5/2021 | Saquib et al. | |

OTHER PUBLICATIONS

Mendes et al., "A Survey on 3D Virtual Object Manipulation: from the Desktop to Immersive Virtual Environments", Computer Graphics Forum, Apr. 2018. (Year: 2018).*

Caputo et al., "The Smart Pin: An effective tool for object manipulation in immersive virtual reality environments", Computers & Graphics 74 (2018) 225-233, May 28, 2018 (Year: 2018).*

Gloumeau et al., "PinNPivot: Object Manipulation Using Pins in Immersive Virtual Environments", IEEE Transactions on Visualization and Computer Graphics, published on Apr. 15, 2020. (Year: 2020).*

Apple, "Creating 3D Content with Reality Composer", Available online at: <https://developer.apple.com/documentation/realitykit/creating_3d_content_with_reality_composer>, Accessed on Jul. 23, 2021, 10 pages.

Autocad, "Rotate 3D Objects", Available online at: <http://docs.autodesk.com/ACD/2010/ENU/AutoCAD%202010%20User%20Documentation/index.html?url=WS1a9193826455f5ffa23ce210c4a30acaf-66f8.htm, topicNumber=d0e103038>, 2010, 1 page.

Rhinoceros, "Gumball", Available online at: <https://docs.mcneel.com/rhino/6/help/en-us/commands/gumball.htm>, Accessed on Jul. 23, 2021, 9 pages.

Rhinoceros, "Object Snaps", Available online at: <http://docs.mcneel.com/rhino/5/help/en-us/user_interface/object_snaps.htm>, Accessed on Jul. 23, 2021, 15 pages.

Rhinoceros, "Rotate3D", Available online at: <http://docs.mcneel.com/rhino/5/help/en-us/commands/rotate3d.htm>, Accessed on Jul. 23, 2021, 1 page.

* cited by examiner

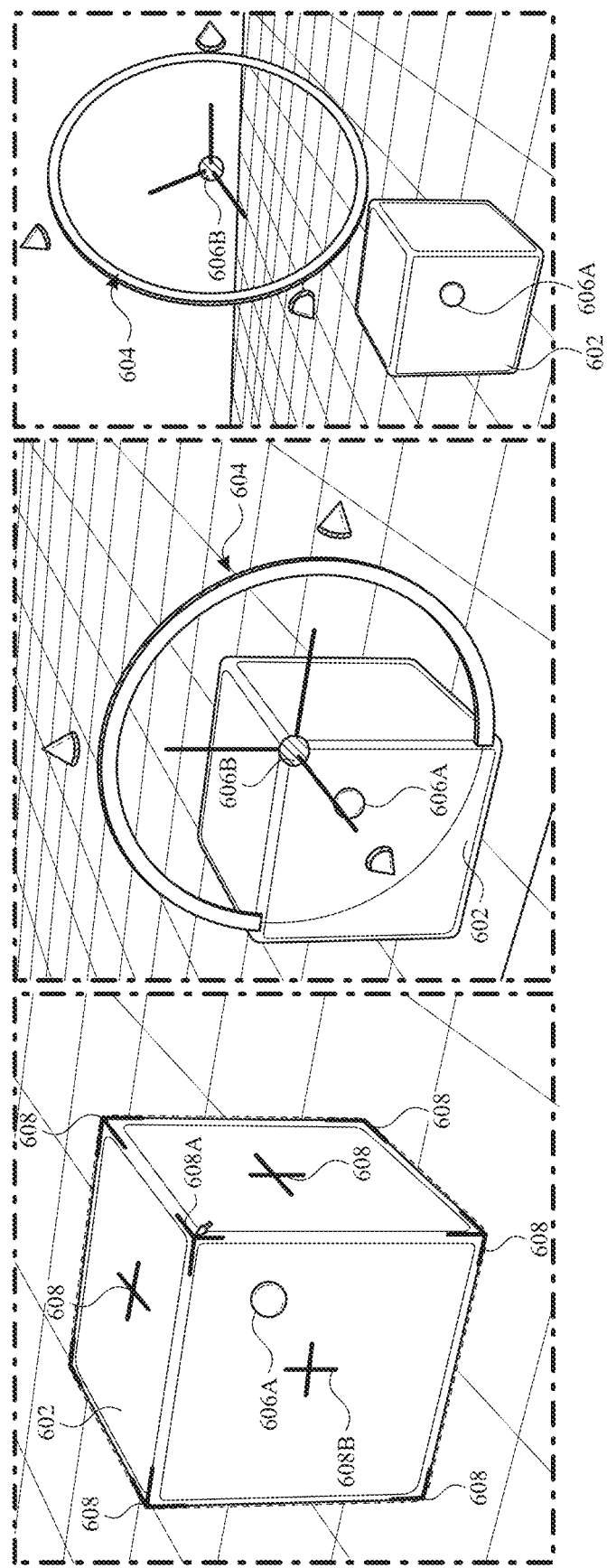

US 12,307,077 B1

TECHNIQUES FOR MANIPULATING COMPUTER-GENERATED OBJECTS IN A COMPUTER GRAPHICS EDITOR OR ENVIRONMENT

CROSS-REFERENCE TO RELATED APPLICATION

This application claims the benefit of U.S. Provisional Application No. 63/039,885, filed on Jun. 16, 2020, the entire disclosure of which is incorporated herein by reference in its entirety for all purposes.

FIELD OF THE DISCLOSURE

This relates generally to computer graphics editors.

BACKGROUND OF THE DISCLOSURE

Computer-generated reality environments are environments where at least some objects displayed for a user's viewing are generated using a computer. In some uses, a user may create or modify computer-generated reality environments, such as by manipulating computer-generated objects in a computer graphics editor or editing environment. Editors that allow for intuitive editing of computer-generated objects are desirable.

SUMMARY OF THE DISCLOSURE

Some embodiments described in this disclosure are directed to computer generated objects associated with a plurality of bookmarked pins. In some embodiments, one pin of the plurality of bookmarked pins can be designated as an object origin (e.g., for run-time physics interactions of the object) and one or more other pins of the plurality of bookmarked pins can be used for other actions during scene editing in the computer graphics editing environment. For example, the one or more other pins can be used as a temporary locus of manipulation (e.g., for rotation, movement, resizing, etc.). The plurality of bookmarked pins can be selectable to display a manipulator element corresponding to a selected pin. Other embodiments described in this disclosure are directed to pins that can be generated in free space, not anchored to any computer generated objects. These free-space pins can instead be anchored to a particular location in a 3D environment and can be used as a reference point for one or more manipulations of objects in the 3D environment, either during run-time interactions with objects in the 3D environment, or during scene editing in the computer graphics editing environment. In some examples, the free-space pin can be a temporary reference point for one or more manipulations (e.g., as described in a similar manner with respect to bookmarked pins). In some examples, the free-space pin can define a reference point for an action or behavior of one or more objects in the run-time environment (e.g., defining motion behavior of objects in a scene). In some embodiments, one or more objects can be temporarily associated with a particular free-space pin, and those one or more objects can be simultaneously manipulated using that free-space pin and/or the free-space pin can define a reference point of one or more actions or behaviors to be performed by the one or more objects with respect to the free-space pin in the environment. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

FIGS. 6A-6C illustrate a view of the 3D environment in a second, different mode of operation according to some embodiments of the disclosure.

DETAILED DESCRIPTION

Figure 1:
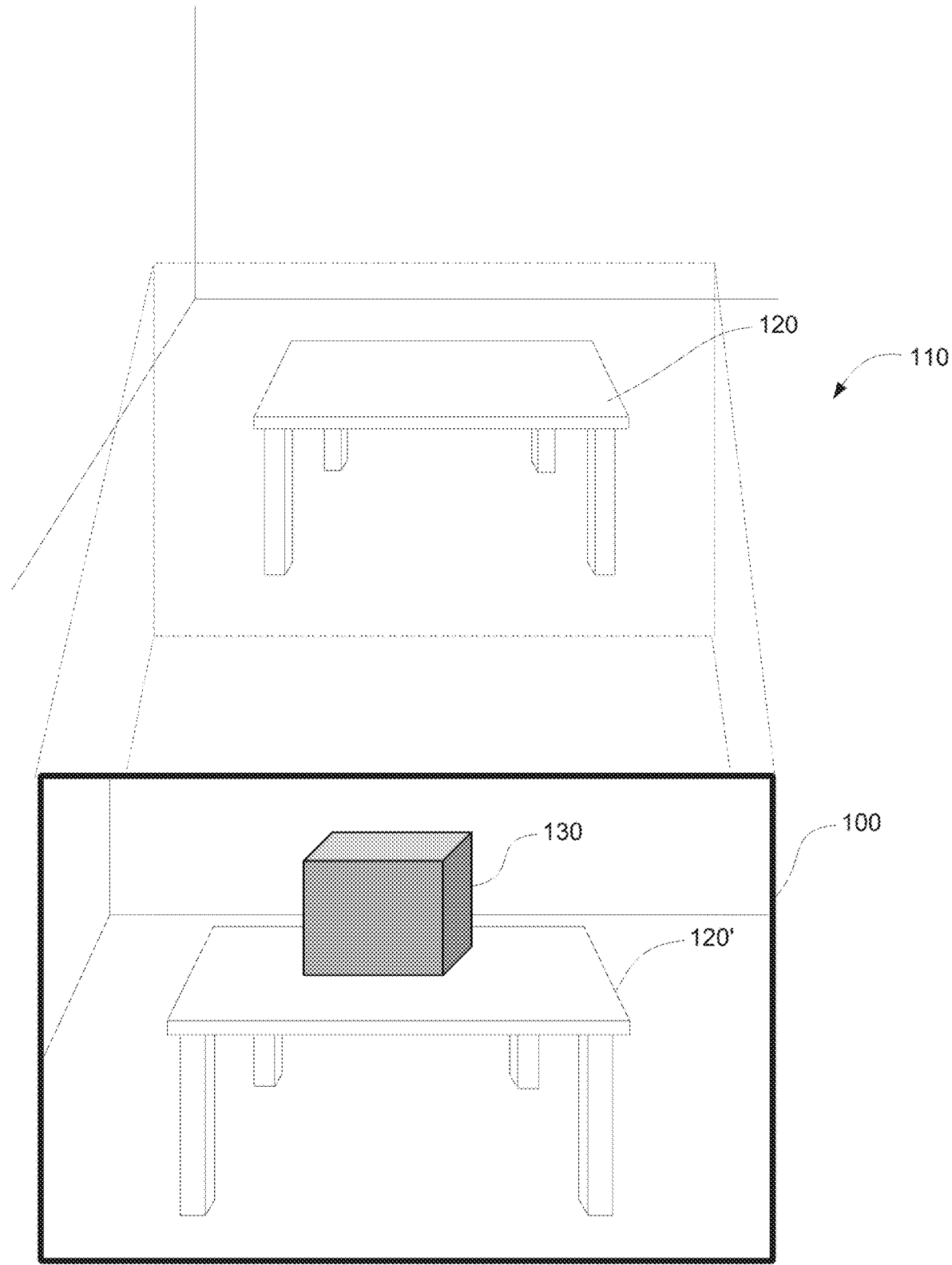
FIG. 1 illustrates an electronic device displaying CGR content according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first object or first pin could be termed a second object or second pin, and, similarly, a second object or second pin could be termed a first object or first pin, without departing from the scope of the various described embodiments. The first object and the second object are both objects, but they are not the same object. Likewise, the first pin and the second pin are both pins, but they are not the same pin.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment (e.g., also referred to as "real-world environment") refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In some embodiments of a CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect the device turning and/or moving and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). Examples of CGR include virtual reality, mixed reality, and augmented reality.

In some embodiments, CGR content can be presented to the user via a CGR file that includes data representing the CGR content and/or data describing how the CGR content is to be presented. In some embodiments, the CGR file includes data representing one or more CGR scenes and one or more triggers for presentation of the one or more CGR scenes. For example, a CGR scene may be anchored to a horizontal, planar surface, such that when a horizontal, planar surface is detected (e.g., in the field of view of one or more cameras), the CGR scene can be presented. The CGR file can also include data regarding one or more objects associated with the CGR scene, and/or associated triggers and actions involving the CGR objects.

In order to simplify the generation of CGR files and/or edit computer-generated graphics generally, a computer graphics editor including an authoring environment graphical user interface (GUI) can be used. In such an authoring environment graphical user interface, a user can create objects from scratch (including the appearance of the objects, behaviors/actions of the objects, and/or triggers for the behaviors/actions of the objects). Additionally or alternatively, objects can be created by other content creators and imported into the graphical user interface, where the objects can be placed into a CGR environment or scene.

In some embodiments, the authoring environment GUI can include one or more graphical user interface elements to enable one or more transformations of an object. A graphical user interface element to transform an object can be referred to herein as a "manipulator" or "manipulator element." The manipulator can be used to perform move, rotate or scale actions on the object. In some embodiments, the manipulator can provide multiple elements to enable multiple transformation actions. In some embodiments, the manipulator can provide the ability to perform move, rotate and scale actions on the object (e.g., as described herein with respect to manipulators). The manipulator can be anchored to a pin corresponding to the origin of the object. As described herein, the manipulator may be anchored to other pins associated with an object. In other embodiments, one or more manipulators may be anchored to one or more free-space pins positioned at particular locations in free-space in a 3D environment. As used herein, the term "affordance" refers to a user-interactive graphical user interface object such as a manipulator or a free-space pin that is, optionally, displayed on a display generation component.

In some embodiments, as described herein, to simplify interactions and improve productivity, an object can include a plurality of bookmarked pins. The bookmarked pins can be selectable pins that can be used as anchor points for the manipulator. As a result, various transformations can be quickly implemented using the manipulator anchored temporarily to different points without being limiting to transformations using a manipulator anchored to the pin at the object origin and/or without having to manually relocate the pin/manipulator to a different locus for transformation. The bookmarked pins can be created and managed in the authoring environment GUI and/or can be imported into the authoring environment GUI with the object.

As mentioned above, in some embodiments a 3D environment can include a plurality of free-space pins to simplify interactions and improve productivity. The free-space pins can be selectable pins that can be used as anchor points for a manipulator. As a result, various object transformations can be quickly implemented using manipulators anchored to different free-space pins, without being limited only to manipulators anchored to pins of (or associated with) an object. In addition, manipulators anchored to free-space pins can eliminate the need to manually relocate the manipulator to a different location for a subsequent transformation. The free-space pins can be created and managed in the authoring environment GUI and/or can be imported into the authoring environment GUI.

Embodiments of electronic devices and user interfaces for such devices are described. In some embodiments, the device is a portable communications device, such as a laptop or tablet computer. In some embodiments, the device is a mobile telephone that also contains other functions, such as personal digital assistant (PDA) and/or music player functions. It should also be understood that, in some embodiments, the device is not a portable communications device, but is a desktop computer or a television. In some embodiments, the portable and non-portable electronic devices may optionally include with touch-sensitive surfaces (e.g., touch screen displays and/or touch pads). In some embodiments, the device does not include a touch-sensitive surface (e.g., a touch screen display and/or a touch pad), but rather is capable of outputting display information (such as the user interfaces of the disclosure) for display on a separate display device, and capable of receiving input information from a separate input device having one or more input mechanisms (such as one or more buttons, a mouse, a touch screen display and/or a touch pad). In some embodiments, the device has a display, but is capable of receiving input information from a separate input device having one or more input mechanisms (such as one or more buttons, a mouse, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support an application for content authoring for computer generated graphics and/or CGR environments.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

FIG. 1 illustrates an electronic device 100 displaying CGR content according to some embodiments of the disclosure. In some embodiments, electronic device 100 is a hand-held or mobile device, such as a tablet computer, laptop computer or a smartphone. Examples of device 100 are described below with reference to FIG. 2. As shown in FIG. 1, electronic device 100 and table 120 are located in the physical environment 110. In some embodiments, electronic device 100 may be configured to capture areas of physical environment 110 including table 120 (illustrated in the field of view of electronic device 100). In some embodiments, in response to a trigger, the electronic device 100 may be configured to display a 3D CGR object 130 (e.g., a cube illustrated in FIG. 1) positioned on top of a CGR representation 120' of real-world table 120. For example, object 130 can be displayed on the surface of the table 120' in the CGR environment displayed on device 100 in response to detecting the planar surface of table 120 in the physical environment 110. A user may desire to create content for a CGR environment such as a CGR scene including multiple objects. CGR content can be created in an authoring environment graphical user interface (GUI) running on device 100 or another electronic device. The examples described herein describe systems and methods of implementing improved content authoring using bookmarked pins.

Figure 2:
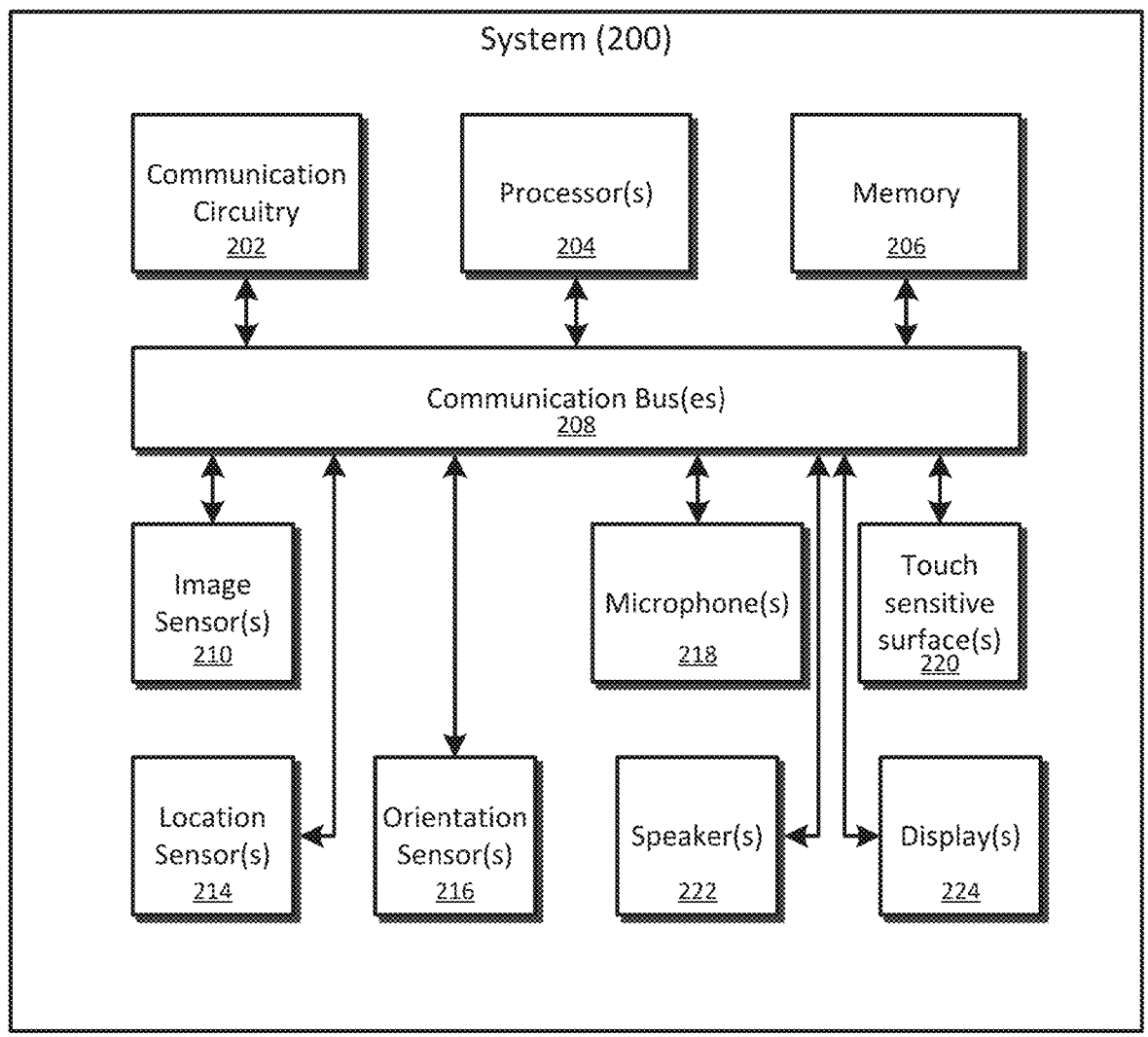
FIG. 2 illustrates a block diagram of exemplary architectures for an electronic device according to some embodiments of the disclosure.

FIG. 2 illustrates a block diagram of exemplary architectures for a system or device 200 in accordance with some embodiments. In some embodiments, device 200 is a mobile device, such as a mobile phone (e.g., smart phone), a tablet computer, a laptop computer, a desktop computer, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, and/or display generation component(s) 224. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication and/or short-range communication, such as Bluetooth®.

Processor(s) 204 include one or more general processors, one or more graphics processors, and/or one or more digital signal processors. In some embodiments, memory 206 is a non-transitory computer-readable storage medium (e.g., flash memory, random access memory) that stores computer-readable instructions configured to be executed by processor(s) 204 to perform the techniques, processes, and/or methods described below (e.g., with reference to FIGS. 3-8B). In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, display generation component(s) 224 can include a single display such as an LED or LCD display, and in other embodiments the display generation component(s) can include a projector, a display with touch capability, a retinal projector, and the like. In some embodiments, display generation component(s) 224 includes multiple displays. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real environment. Image sensor(s) 210 also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 210 also optionally include one or more event camera(s) configured to capture movement of physical objects in the real environment. Image sensor(s) 210 also optionally include one or more depth sensor(s) configured to detect the distance of physical objects from device 200. In some embodiments, information from one or more depth sensor(s) can allow the device to identify and differentiate objects in the real environment from other objects in the real environment. In some embodiments, one or more depth sensor(s) can allow the device to determine the texture and/or topography of objects in the real environment.

In some embodiments, device 200 uses CCD sensors, event cameras, and depth sensors in combination to detect the physical environment around device 200. In some embodiments, image sensor(s) 220 include a first image sensor and a second image sensor. The first image sensor and the second image sensor work in tandem and are optionally configured to capture different information of physical objects in the real environment. In some embodiments, the first image sensor is a visible light image sensor and the second image sensor is a depth sensor. In some embodiments, device 200 uses image sensor(s) 210 to detect the position and orientation of device 200 and/or display generation component(s) 224 in the real environment. For example, device 200 uses image sensor(s) 210 to track the position and orientation of display generation component(s) 224 relative to one or more fixed objects in the real environment.

In some embodiments, device 200 includes microphones(s) 218. Device 200 uses microphone(s) 218 to detect sound from the user and/or the real environment of the user. In some embodiments, microphone(s) 218 includes an array of microphones (including a plurality of microphones) that optionally operate in tandem, such as to identify ambient noise or to locate the source of sound in space of the real environment.

Device 200 includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real environment. Orientation sensor(s) 216 optionally include one or more gyroscopes and/or one or more accelerometers.

Device 200 is not limited to the components and configuration of FIG. 2, but can include other or additional components in multiple configurations.

Figure 3:
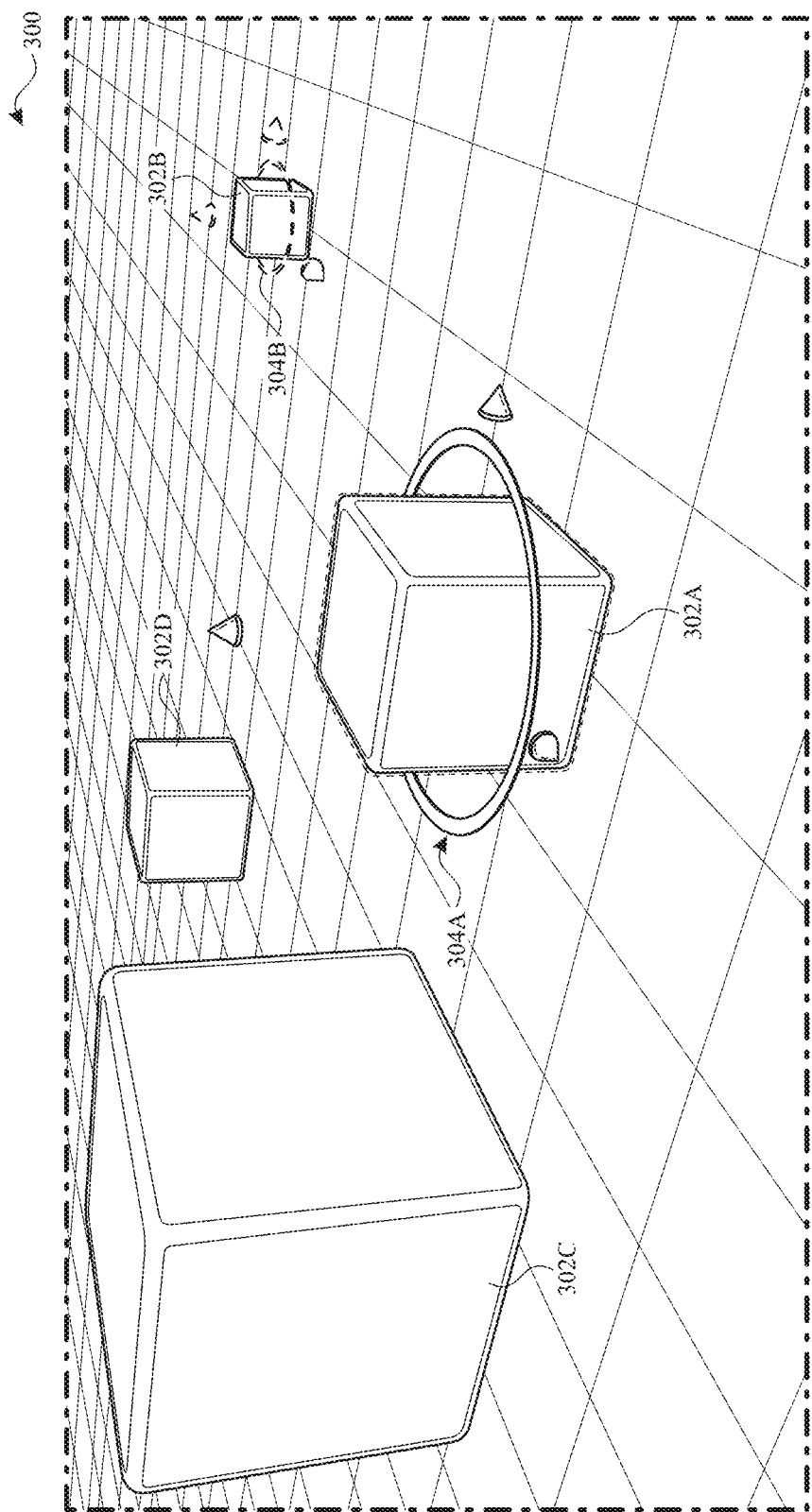
FIG. 3 illustrates an example view of an authoring environment graphical user interface (GUI) including one or more objects according to some embodiments of the disclosure.

Attention is now directed towards examples of graphical user interfaces ("GUIs") and associated processes that are implemented on an electronic device, such as electronic device 100 or device 200. The GUIs can be part of a computer graphics editor that may include a display of a computer graphics editing environment. FIG. 3 illustrates an example view 300 of an authoring environment GUI including one or more objects according to some embodiments of the disclosure. Authoring environment GUI can be displayed on an electronic device (e.g., similar to device 100 or 200) including, but not limited to, portable or non-portable computing devices such as a tablet computing device, laptop computing device or desktop computing device. View 300 illustrates a three dimensional (3D) environment including one or more objects in a first mode of operation (e.g., a scene editing mode). For example, FIG. 3 includes objects 302A-302D represented as cubes. It should be understood that the cubes are representative and one or more different objects (e.g., 1D, 2D or 3D objects) can be included in the 3D environment. Additionally, it should be understood, that the 3D environment (or 3D object) described herein may be a representation of a 3D environment (or 3D object) displayed in a two dimensional (2D) context (e.g., displayed on a 2D screen). In some embodiments, the 3D environment can display gridlines (as shown) or other indicators to assist a content creator with placement and/or size of an object in the 3D environment. As shown in view 300, the GUI can also display a manipulator to enable transformations of a selected object. For example, view 300 shows object 302A as the selected object, and manipulator 304A displayed anchored to an origin of object 302A (e.g., to the geometric center of the cube). When a different object is selected, the manipulator can be displayed anchored to an origin of a different selected object. For example, selection of object 302B can be accompanied by the display of manipulator 304B anchored to an origin of object 302B. In some embodiments, when a single object is selected a single manipulator is displayed corresponding to the selected object (ceasing to display the manipulator with respect to any other object).

The manipulator, such as manipulators 304A-304B, can include, in some embodiments, a ring and three arrows (shown as cones in FIG. 3). In some embodiments, actuating or translating one of the arrows can result in movement of the object along the corresponding axis. In some embodiments, clicking inside the ring and translating can result in movement of the object along the plane defined by the ring.

Additionally, rotating the ring (e.g., using a click-and-drag operation) can rotate the object axially from the anchor of the object, and pulling the ring perpendicular to the ring can scale the object (up or down depending on the direction). Thus, the ring/arrows of the manipulator can provide for 3D translation, rotation and scaling in the 3D environment.

Figure 4:
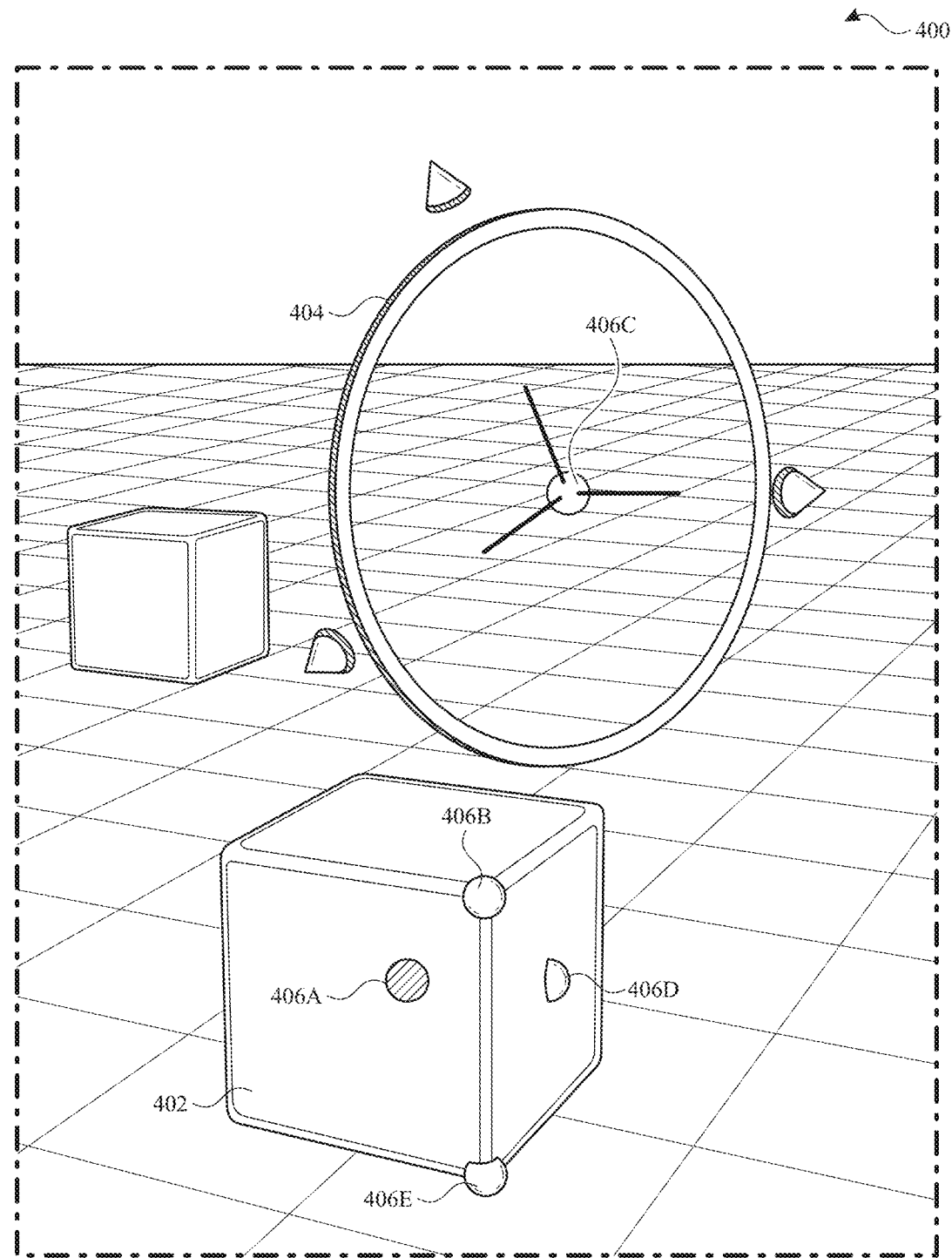
FIG. 4 illustrates an example view of an authoring environment GUI including an object associated with multiple pins according to some embodiments of the disclosure.

As described herein, to simplify interactions and improve productivity in an authoring environment GUI, an object for use in a CGR scene (e.g., virtual/augmented/mixed reality) can include a plurality of bookmarked pins. It should be understood that objects associated with a plurality of bookmarked pins could be used for content authoring in other contexts aside from the CGR scene context (e.g., for any computer generated graphics). FIG. 4 illustrates an example view 400 of an authoring environment GUI including an object associated with multiple pins according to some embodiments of the disclosure. View 400 illustrates a 3D environment including one or more objects in a second mode of operation (e.g., a pin editing mode), different from the first mode of operation (e.g., a scene editing mode). FIG. 4 illustrates an object 402 (e.g., corresponding to object 302) including multiple associated pins 406A-406E. Object 402 is illustrated as a cube with five associated bookmarked pins. Pin 406A is illustrated at a geometric center of object 402 (internal to object 402), pin 406B is located at a first corner of object 402, pin 406C is located outside object 402, pin 406D is located at the center of a face of object 402 (at the surface of object 402), and pin 406E is located at a second, different corner of object 402. Although not shown in FIG. 4, in some embodiments view 400 may also show a selected object with one or more free-space pins temporarily associated with that object and/or defining a reference point of one or more actions or behaviors to be performed by the object. It should understood that in different embodiments, different numbers of pins (more or fewer) and different placements of pins are possible. In some embodiments, associated bookmarked pins can be located internal to an object, external to an object, and/or on a surface of the object.

As shown in view 400, a selected pin can be displayed along with a manipulator 404 (e.g., corresponding to manipulator 304A) in the authoring environment GUI. In some embodiments each pin illustrated in view 400 can have the same appearance. In some embodiments, one or more pins can look different from other pins. In some embodiments, a pin designated object origin (for physics actions in a scene) or a pin at a geometric center of the object may have a different appearance (e.g., different size, shape, color, shading, etc.) than other pins. For example in FIG. 4, pin 406A at the geometric center of object 402 can have a different appearance than pins 406B-E. In some embodiments, one or more imported pins (included with the object) may have a different appearance (e.g., different size, shape, color, shading, etc.) than pins subsequently added in the authoring environment GUI. In some embodiments, a selected pin may also have a different appearance from the other pins (optionally, in addition to the appearance of manipulator 404). In some embodiments, the selected pin can be highlighted or otherwise different in appearance (e.g., different size, shape, color, shading, etc.).

As mentioned above, view 300 illustrates a view of the 3D environment in a first mode of operation (e.g., scene editing mode) and view 400 illustrates a view of the 3D environment in a second, different mode of operation (e.g., pin editing mode). In some embodiments, pins are illustrated in the pin editing mode (e.g., as shown in FIG. 4) and are not displayed in the scene editing mode (as shown in FIG. 3). In some embodiments, the appearance of the manipulator can be different in the different modes of operation (e.g., different size, shape, color, shading, etc.). For example, FIG. 4 illustrates manipulator 404 with a ring around the base of the directional arrows in pin editing mode with a different appearance than a ring around the base of the direction arrows of manipulator 304A in the scene editing mode (e.g., a different color, shading, etc.). Additionally or alternatively, an outline around the manipulator ring can have a different appearance (e.g., different color, shading, etc.) for manipulator 404 in pin editing mode than for manipulator 304A in scene editing mode. Additionally or alternatively, manipulator 404 in pin editing mode can include axes lines within the manipulator ring indicative of the local orientation of the pin in the 3D environment, whereas manipulator 304A may not display axes lines.

Figures 5A, 5B, 5C:
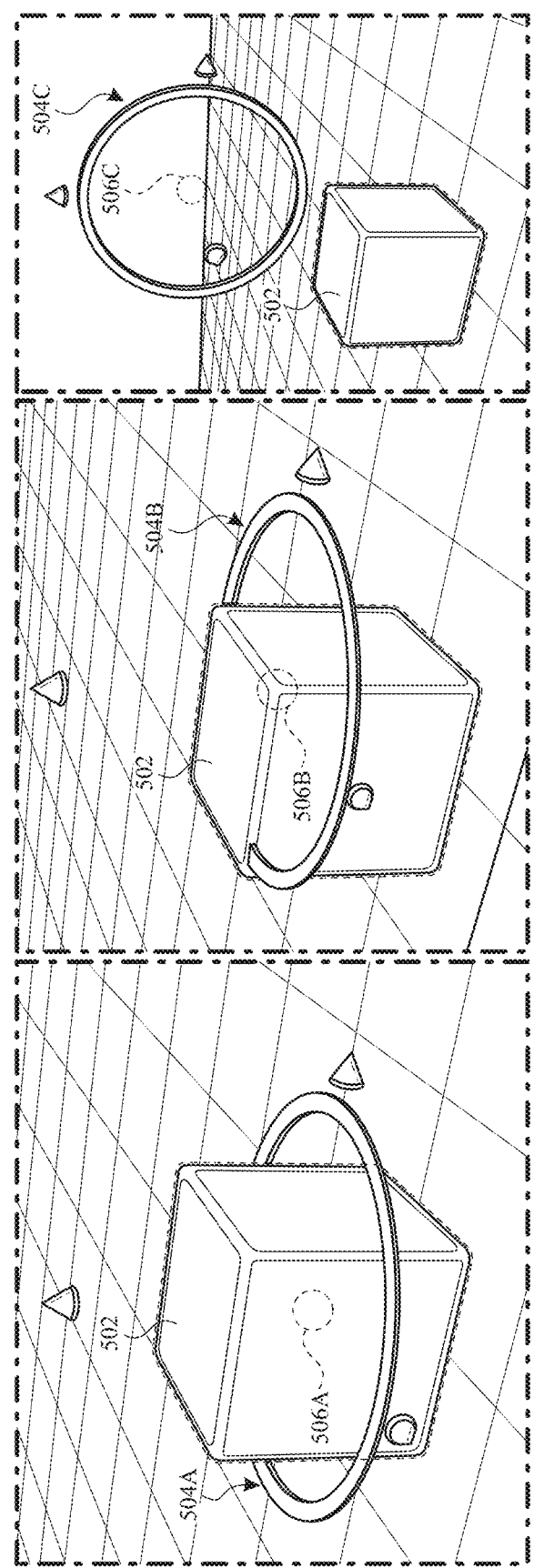
FIGS. 5A-5C illustrate an example object associated with multiple bookmarked pins according to some embodiments of the disclosure.

FIGS. 5A-5C illustrate an example object associated with multiple bookmarked pins according to some embodiments of the disclosure. Although not shown in FIGS. 5A-5C, in some embodiments free-space pins temporarily associated with the object (and/or defining a reference point of one or more actions or behaviors to be performed by the object) may also be displayed. FIGS. 5A-5C illustrate a 3D environment in a first mode of operation (e.g., a scene editing mode). FIG. 5A illustrates object 502 (e.g., corresponding to object 302, 402) with manipulator 504A (e.g., corresponding to manipulator 304A) anchored to a bookmarked pin at the geometric center of object 502 (e.g., corresponding to pin 406A). FIG. 5B illustrates object 502 with manipulator 504B anchored to a second, different bookmarked pin at a corner of object 502 (e.g., corresponding to pin 406B). FIG. 5C illustrates object 502 with manipulator 504C anchored to a bookmarked pin external to object 502 (e.g., corresponding to pin 406C).

In some embodiments, the authoring environment GUI provides for selecting different bookmarked pins of the object. Selecting among the different bookmarked pins enables a user to quickly transition to different locations to provide a temporary locus of manipulation during scene editing mode (e.g., via the second manipulator element anchored to the selected bookmarked pin). For example, a user can quickly transition from manipulator 504A anchored at pin 506A to manipulator 504B or 504C anchored at pins 506B and 506C (or another bookmarked pin) to provide a different, temporary locus that can be used for rotating, scaling or translating the object among other possible actions, without having to manually move the manipulator between these different positions (which would be more time-consuming). For example, selecting pin 506A and using manipulator 504A for rotation can cause pin 506A to serve as a locus of rotation (e.g., a center or rotation or an axis of rotation) such that object 502 rotates with respect to pin 506A. In a similar manner, selecting pins 506B and 506C, respectively, and using manipulator 504B or 504C, respectively, for rotation can cause pin 506B or 506C, respectively, to serve as a temporary locus of rotation (e.g., a center of rotation or an axis of rotation) such that object 502 rotates with respect to pin 506B or 506C respectively. In other words, a first manipulator of a first pin can have a first locus of rotation and a second manipulator of a second pin (different from the first pin) can have a second locus of rotation (different from the first locus of rotation).

Figure 7:
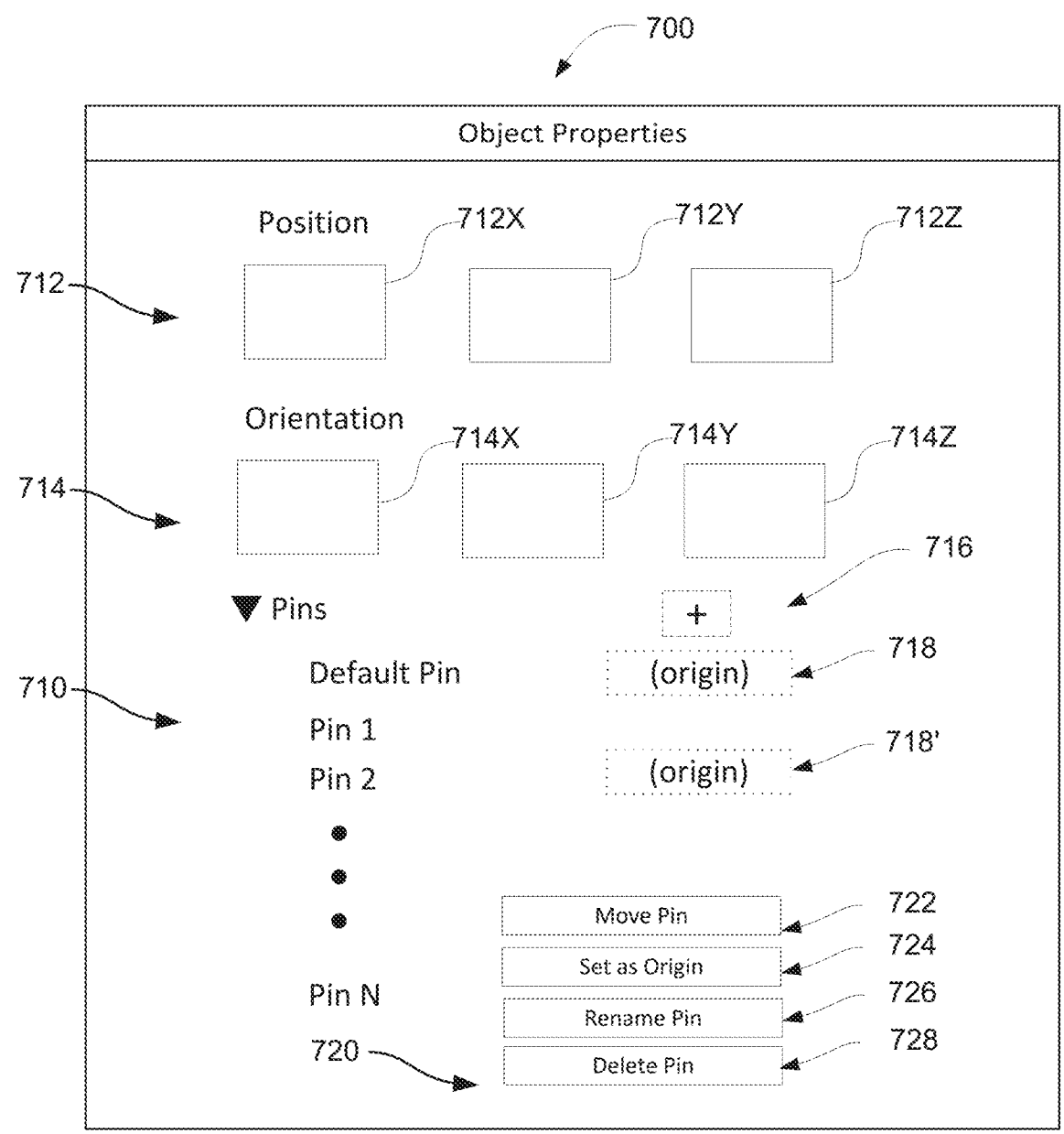
FIG. 7 illustrates an example object properties pane according to some embodiments of the disclosure.

In some embodiments, switching between the bookmarked pins can be achieved using an input in a list of bookmarked pins (as described in more detail with respect to FIG. 7). In some embodiments, a tap gesture on a touch screen or a mouse click on one of the pins in the list of bookmarked pins can be used to select a pin from the list of bookmarked pins. In some embodiments, the tap gesture or mouse click on a pin can toggle from scene editing mode to pin editing mode. A tap and hold gesture (long press) on a touch screen or a mouse click in combination with a shortcut key (control key, shift key, alt key, command key, windows key, function key, etc.) on one of the pins in the bookmarked pins can select the pin. It should be understood that these embodiments are exemplary and other input options are available. In some embodiments, a keyboard shortcut can be used to toggle between pins without need for input to a touch screen/touch pad or mouse.

As described herein, one pin of the bookmarked pins can be defined as an object origin pin. In some embodiments, the object origin can be included as part of the data imported with an object. In some embodiments, the object origin can be a geometric center of the object. In some embodiments, the object origin can be changed to a different pin of the bookmarked pins. A pin set as an object origin can be a locus for actions during runtime of the scene being edited (e.g., for physics based reactions to triggers).

In some embodiments, when an object is first selected, the manipulator is displayed anchored to the object origin. In some embodiments, the manipulator is displayed anchored to the object origin when the object is reselected irrespective of which pin was selected previously for the object. For example, if a first object 302A were selected in the 3D environment, manipulator 304A can be displayed anchored to the object origin of object 302A. Subsequently, if a second object 302B were selected, manipulator 304B can be displayed anchored to the object origin of object 302B (deselecting first object 302A and ceasing display of manipulator 304A). Subsequently, if the first object 302A were reselected, manipulator 304A can again be displayed anchored to the object origin (deselecting second object 302B and ceasing display of manipulator 304B). In such embodiments, the manipulator is anchored to the object origin (e.g., as shown in FIGS. 3 and 5A) when the first object is reselected irrespective of whether another bookmarked pin were selected for the first object 302A prior to selecting the second object 302B (e.g., irrespective of whether pin 506B were selected and manipulator 504B displayed, or whether pin 506C were selected and manipulator 504C displayed for object 502). In some embodiments, the manipulator is displayed anchored to the object origin when transitioning back to scene editing mode from pin editing mode while an object remains selected, irrespective of which pin of the object was selected previously. For example, if a first object were selected and subsequently pin editing mode were invoked and a different pin selected (e.g., pin 506B or 506C), upon exiting the pin editing mode, the first object is displayed with manipulator 504A anchored to the pin designated as the object origin. In some embodiments, the last used pin of an object is stored and the manipulator is displayed anchored to the last used pin when the object is reselected (or upon exiting pin editing mode). In some embodiments, the last edited pin is stored and the manipulator is displayed anchored to the last edited pin upon exiting pin editing mode. In some embodiments, after transitioning to a different pin (e.g., used as a temporary locus), the manipulator can remain anchored to the different pin until another object is selected, a mode of operation is changed or another pin is selected.

In some embodiments, the bookmarked pins can be imported with an object into the authoring environment GUI. In some embodiments, one or more bookmarked pins can be added to an object, or one or more free-space pins can be temporarily associated with the object in the authoring environment GUI (and/or one or more free-space pins can define a reference point of one or more actions or behaviors to be performed by the object). FIG. 6A-6C illustrate adding a pin according to some embodiments of the disclosure. FIGS. 6A-6C illustrate a view of the 3D environment in a second, different mode of operation (e.g., pin editing mode). In the pin editing mode, the object is displayed including one or more pins. For example, in FIG. 6A object 602 (e.g., corresponding to object 302A, 402, 502) is shown with pin 606A (e.g., corresponding to pin 506A) at the geometric center of object 606A. In some embodiments, in response to an input to add a pin to the object, one or more targets can be displayed overlaid over the object. For example, FIG. 6A illustrates object 602 including multiple targets 608 overlaid over/displayed around object 602, including a target 608A on a corner of object 602 and a target 608B on a face of object 602. In some embodiments, each of the targets are discrete visual elements placed at discrete locations around object 602 (e.g., the elements are not contiguous and do not touch each other). In some embodiments, targets 608 have a plus-sign shape, with planar representation of the target on a planar surface and a non-planar representation of the targets on a non-planar location (e.g., at a corner or other vertex). In some embodiments, targets 608 can be any other shape (e.g., rectangular, square, triangular, circular, oval, etc.).

Actuating one of the targets 608 (e.g., by tapping or clicking, etc.) can cause a new pin to replace the actuated target. For example, FIG. 6B illustrates target 608A replaced with pin 606B (e.g., corresponding to pin 506B). Other bookmarked pins (e.g., pin 606A) can also be concurrently displayed. In some embodiments, manipulator 604 can also be displayed anchored to pin 606B. In some embodiments, actuating one of the targets can additionally cease the display of the remaining targets. In some embodiments, the targets can remain displayed to enable adding multiple pins by actuating other targets, until other input is received (e.g., input to move or otherwise modify a pin or to exit the pin editing mode, etc.). It should be understood that the use of targets for adding pins is an example and adding pins can be done in alternative ways in other embodiments. For example, a user input can add a pin at a location (and optionally with an orientation) specified by the user, specified by the content authoring application, or at random in the 3D environment.

In some embodiments, after placing pin 606B (e.g., by actuating target 608A), pin 606B can be modified. For example, pin 606B can be moved to a different position and/or the orientation of pin 606B can be changed. For example, an input can be received to move pin 606B from its initial position to a new position relative to object (e.g., using the ring/arrows of manipulator 606B in pin editing mode). Additionally or alternatively, an input can be received to change an orientation of pin 606B from its original position to define a new local orientation relative to the object (e.g., using the ring of manipulator 604 in pin editing mode). FIG. 6C illustrates pin 606B moved from its initial position on the corner of object 602 to a new position external to object 602 in the 3D environment and with a new orientation relative to object 602. The position and/or the local orientation can be stored for the pin and can be recalled when the pin is selected for use as a temporary locus in scene editing mode.

As described herein, the authoring environment GUI can include information about object properties. The object properties can include location information of the object (or pins), orientation information of the object (or pins) and/or pin information of the bookmarked pins associated with the object, or free-space pins temporarily associated with the object (and/or defining a reference point of one or more actions or behaviors to be performed by the object). In some embodiments, the information can be represented in an object properties pane (or other window). In some embodiments, the object properties pane can be displayed concurrently with the 3D environment.

FIG. 7 illustrates an example object properties pane 700 according to some embodiments of the disclosure. In some embodiments, object properties pane 700 includes a list 710 of bookmarked pins corresponding to a selected object (list shown expanded in FIG. 7). In some embodiments, object properties pane 700 includes a representation 712 of position. In some embodiments, representation 712 of position can include 3D coordinates including an X coordinate 712X, Y coordinate 712Y and Z coordinate 712Z. In a pin editing mode, position can represent the position of a selected pin relative to the object (e.g., corresponding to the object origin). In a scene editing mode (or prior to the selection of a pin in the pin editing mode), the position can represent the position of the object (e.g., corresponding to the object origin) in the 3D environment. In some embodiments, object properties pane 700 includes a representation 714 of orientation. In some embodiments, representation 714 of orientation can include 3D coordinates including an X coordinate 714X, Y coordinate 714Y and Z coordinate 714Z. In a pin editing mode, representation 714 of orientation can represent the local orientation of a selected pin in the 3D environment relative to the object. In a scene editing mode (or prior to the selection of a pin in the pin editing mode), the representation 714 of orientation can represent the orientation of the object in the 3D environment. The manipulator illustrated can be anchored to the position shown in object properties pane 700 and/or oriented according to the orientation shown in object properties pane 700.

List 710 of pins can show the bookmarked pins associated with an object, or free-space pins temporarily associated with the object (and/or defining a reference point of one or more actions or behaviors to be performed by the object). In some embodiments, an input to select one of the pins (e.g., tap, or clicking or other input) can invoke a context menu 720 including user interface elements 722-728 (e.g., buttons) to perform user actions associated with the pin (although a context menu of actions may not be available for free-space pins in the list). The actions can include, in some embodiments, moving a pin (to change the position and/or orientation of the selected pin), setting a pin as the object origin, renaming a pin and/or deleting a pin. It should be understood that more, fewer and/or different actions are possible than the examples illustrated in FIG. 7.

For example, after displaying context menu 720, an input to actuate (e.g., tap, click, etc.) user interface element 722 can be used to change the location and/or the orientation of the respective pin (e.g., as illustrated, for example, by the movement of pin 606B from the corner of object 602 in FIG. 6B to an position outside of object 602 in FIG. 6C).

For example, after displaying context menu 720, an input to actuate (e.g., tap, click, etc.) user interface element 724 can be used to designate the respective pin as the origin of the object. In some embodiments, an object can be imported with a pin corresponding to the object origin as a default. This pin (labeled "default pin") can be indicated as the object origin by tag 718 ("origin") in list 710 by default. In some embodiments, the tag indicating the object origin can be displayed once there are multiple pins or once the process to add a second pin is started. In some embodiments, in response to the actuation of user interface element 724, the object origin tag can be moved to the selected pin. For example, if "pin 2" were selected, the object origin tag can be moved to "pin 2" as illustrated by tag 718' (ceasing to display tag 718 by the default pin or previously designated object origin pin).

For example, after displaying context menu 720, an input to actuate (e.g., tap, click, etc.) user interface element 726 can be used to rename the respective pin. Renaming the pin can change the name of the pin appearing in list 710 from a generic name (e.g., pin [number]) to a more meaningful name. As a result, the pin can provide, for example, contextual information about the location, orientation and/or purpose of the pin for reference, as opposed to referencing the pins more generically (e.g., by number).

For example, after displaying context menu 720, an input to actuate (e.g., tap, click, etc.) user interface element 728 can be used to delete the respective pin. Deleting the pin can remove the pin from list 710. For example, the pin may be useful for a content creator designing the object or for certain types of scenes, but may be unnecessary for downstream or other users or for certain applications or types of scenes. Removing these pins can reduce the number of bookmarked pins where such pins are unneeded, reducing clutter on the user interface and making it easier to switch between the necessary bookmarked pins.

Object properties pane 700 can include a user interface element 716 for adding pins to the list of pins. In some embodiments, actuating user interface element 716 can trigger pin editing mode and the display of targets 608 as shown in FIG. 6A. In some embodiments, actuating user interface element 716 can place a pin associated with the object in the 3D environment (as random or as defined by the authoring environment GUI) or request input coordinates for placement of the pin and/or request input coordinates for the local orientation of the pin. In some embodiments, the location and/or orientation coordinates can be entered in representation 712 of the position and/or representation 714 of the orientation. In some embodiments, actuating user interface element 716 can also expand list 710 if list 710 is collapsed.

As described above, in some embodiments, the authoring environment GUI can transition from the scene editing mode to the pin editing mode in response to actuating user interface element 716. In some embodiments, selecting a pin in list 710 (e.g., by tap, click, etc.) can also transition the authoring environment GUI from the scene editing mode to the pin editing mode. In some embodiments, the authoring environment GUI can transition from the scene editing mode to the pin editing mode via a menu, toggle or shortcut, among other possibilities. In some embodiments, the transition from pin editing mode to scene editing mode can be achieved via a menu, toggle or shortcut among other possibilities. In some embodiments, the transition from pin editing mode to scene editing mode can be achieved by selecting one of the objects in the 3D environment (e.g., the selected object or another object). In some embodiments, the transition from pin editing mode to scene editing mode can be achieved by collapsing list 710.

Figure 8A:
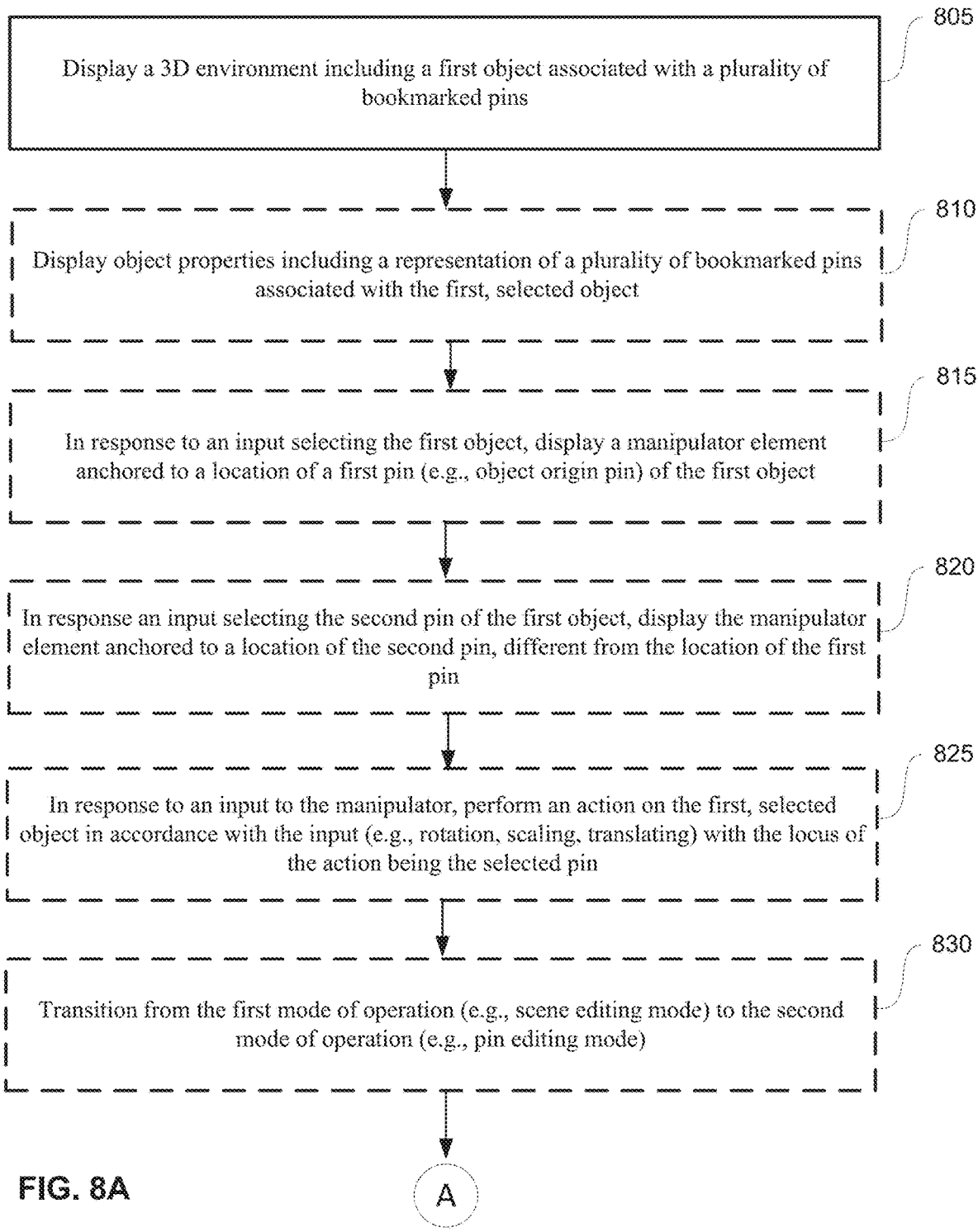
FIGS. 8A-8B illustrate a flow diagram illustrating a process for a user interface including an object associated with bookmarked pins according to some embodiments of the disclosure.
Figure 8B:
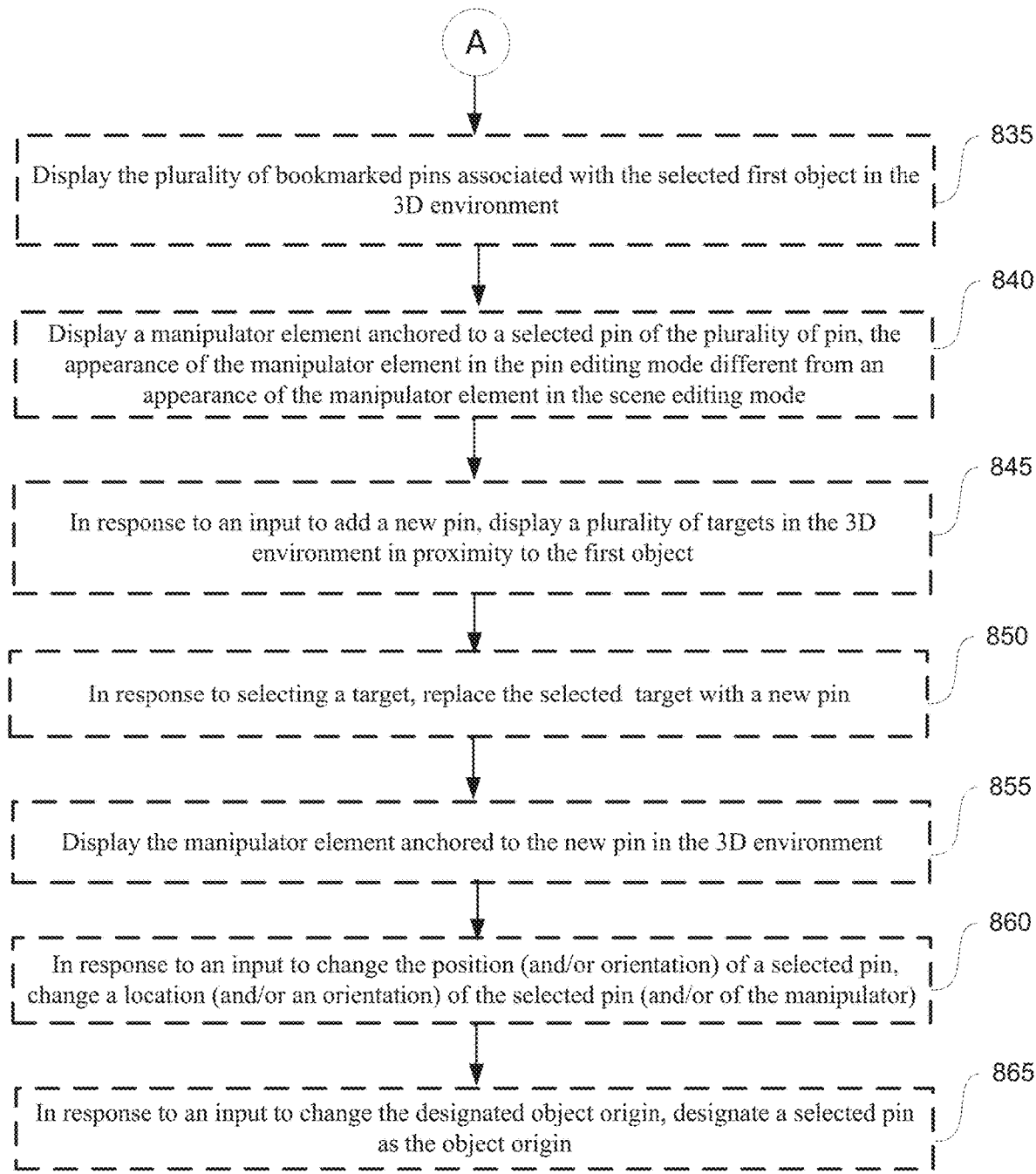

FIGS. 8A-8B illustrate a flow diagram illustrating a process 800 for a user interface (e.g., an authoring environment GUI) including an object associated with bookmarked pins in accordance with some embodiments of the disclosure. Process 800 includes, at 805, displaying a representation of a 3D environment including one or more objects (e.g., 3D computer generated objects). The one or more objects include a first object associated with a plurality of bookmarked pins including a first pin and a second pin. The plurality of bookmarked pins are selectable to display a manipulator element corresponding to a selected pin. In some embodiments, process 800 optionally includes displaying (e.g., concurrently with the 3D environment), at 810, object properties (e.g., in a pane in the GUI) including one or more properties of a selected object. The object properties optionally include a representation of a plurality of bookmarked pins associated with the selected object. In some embodiments, the object properties displayed can include location and/or orientation information.

In some embodiments, the appearance of the first object (and/or pins and/or manipulator) in the display depends on a mode of operation such that the appearance is different in a first mode of operation (a scene and/or object editing mode) and in a second mode of operation (a pin editing mode). For example, in a scene editing mode, the plurality of bookmarked pins may not be displayed, but a manipulator anchored to a selected or default pin may be displayed. For example, at 815, in response to an input selecting the first object (or reselecting the first object, or optionally upon exiting the pin editing mode), process 800 can include displaying a manipulator element anchored to a location of the first pin (e.g., object origin pin of the plurality of bookmarked pins) of the first object. At 820, in response to an input selecting the second pin of the plurality of bookmarked pins associated with the first object (different from the first pin), process 800 can include displaying the manipulator element anchored to a location of the second pin, different from the location of the first pin. Thus, selecting a different pin of the plurality of bookmarked pins can shift the manipulator to a different locus (e.g., ceasing to display the manipulator at the location of the first pin). At 825, in response to an input to the manipulator (whether displayed at the location of the first pin or at the location of the second pin), process 800 can include performing an action on the object in accordance with the input (e.g., rotation, scaling, translating) with the locus of the action being the selected pin.

Process 800 can include, at 830, transitioning from the first mode of operation (e.g., scene or object editing mode) to the second mode of operation (e.g., pin editing mode). In some embodiments, transitioning between the modes can be triggered by selection of a pin in a representation of the plurality of bookmarked pins or by an input to add a pin to the representation of the plurality of bookmarked pins. In pin editing mode, in some embodiments, process 800 includes, at 835, displaying the plurality of bookmarked pins associated with the selected first object in the 3D environment. Additionally or alternatively, process 800 includes, at 840, displaying a manipulator element anchored to a selected pin of the plurality of pins. The appearance of the manipulator element in the pin editing mode is different from an appearance of the manipulator element in the scene editing mode, in some embodiments.

The plurality of bookmarked pins associated with the object can be modified. The modifications can include adding pins, deleting pins, moving pins, renaming pins and/or designating a pin as the object origin. In some embodiments, at 845, the process can further include displaying a plurality of targets in the 3D environment in proximity to (e.g., overlaid over or displayed around) the first object in response to an input to add a new pin. In some embodiments, at 850, the process 800 can further include replacing a selected/actuated target with a new pin (and optionally the new pin can be added to a representation of a plurality of bookmarked pins) in response to selecting/actuating the target. In some embodiments, at 855, process 800 can include displaying the manipulator element anchored to the new pin in the 3D environment. In some embodiments, at 860, process 800 can further include changing a location (and/or an orientation) of a selected pin (and/or the manipulator) in response to an input to change the position (and/or orientation) of the pin. In some embodiments, at 865, process 800 can further include designating a selected pin as the object origin (e.g., for run-time actions) from a previously designated object origin (e.g., an imported pin and/or geometric center pin) in response to an input to change the designated object origin.

It is understood that process 800 is an example and that more, fewer, or different operations can be performed in the same or in a different order. Additionally, the operations in process 800 described above are, optionally, implemented by running one or more functional modules in an information processing apparatus such as general-purpose processors (e.g., as described with respect to FIG. 2) or application specific chips, and/or by other components of FIG. 2.

Although the description above primarily focuses on one selected object and its associated bookmarked pins, it should be understood that multiple objects in a computer graphics editing environment can have common associated bookmarked pins. In some embodiments, an object with a set of associated bookmarked pins can be duplicated in the 3D environment or multiple instantiations of the same object can be otherwise invoked within the 3D environment. The duplicate objects can each have the same set of associated bookmarked pins. For example, referring back to FIG. 3, objects 302A-302D can, in some embodiments, represent the same object type with the same associated bookmarked pins. For example, object 302A can have multiple bookmarked pins (e.g., N+1 pins illustrated in list 710). Duplicating object 302A with its bookmarked pins (or otherwise instantiating multiple versions of object 302A) to create objects 302B-302D can result in objects 302B-302D each having the same bookmarked pins. It should be understood that objects 302A-302D in FIG. 3 may be different objects with different pins in other embodiments.

In some embodiments, selecting multiple instantiations of an object with the same bookmarked pins simultaneously can allow for simultaneous manipulation of the multiple objects via the shared bookmarked pins. For example, referring back to FIG. 3, objects 302A-302D can represent four instantiations of the same object type with the same bookmarked pins. When objects 302A-302D are selected simultaneously, a manipulator can be displayed anchored to a pin and input to the manipulator can result in transformation for each of the objects with respect to the corresponding shared pin for each respective object (without requiring independent manipulators and inputs to perform the same transformation to each of the objects individually). For example, while objects 302A-302D are simultaneously selected a manipulator 304A can be displayed anchored to a pin (e.g., the object origin) of object 203A. A rotation input to manipulator 304A can result in rotation of each of objects 302A-302D about their object origin pin. In some examples, the manipulator can be moved to a different bookmarked pin as a temporary locus of action for the simultaneously selected objects. In some embodiments, the same behavior (manipulation of multiple objects using a shared pin/locus of one of the objects) can be achieved for simultaneously selected objects of different type and having different pins as long as the objects include a shared bookmarked pin and the shared bookmark pin is selected as the temporary locus of action. For example, each of objects 302A-302D can be different objects including one or more shared bookmarked pins (e.g., different shapes each having an object origin pin at a geometric center, different characters each having a pin for a hand, or head, or other body part, etc.) that can be used to perform a common action (e.g., rotation, turning the head, lifting a hand, etc.) using the shared pin as a locus for the action with respect to each of the selected objects, via input to a manipulator anchored to the shared bookmarked pin of one of the selected objects.

Figure 9:
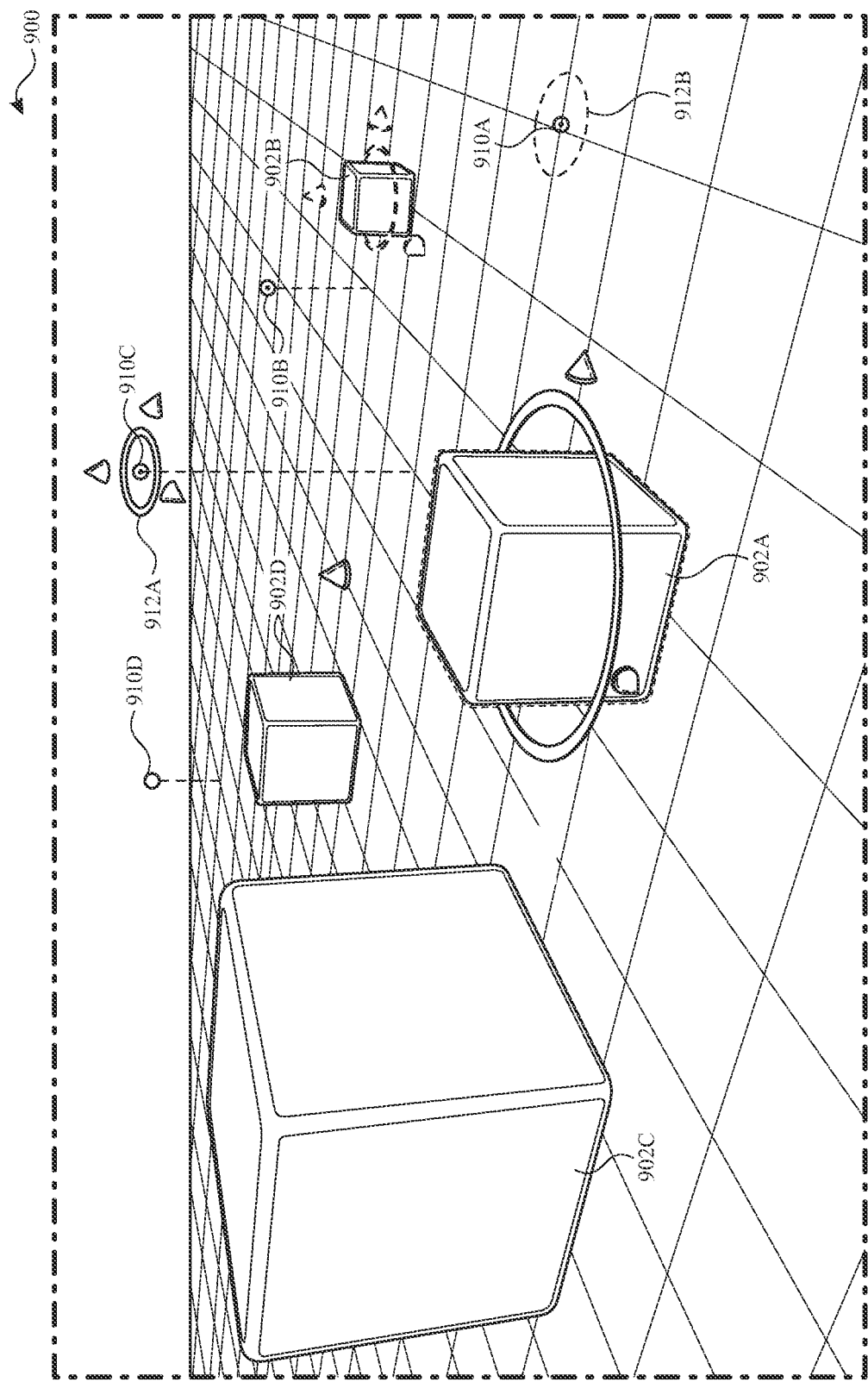
FIG. 9 illustrates an example view of an authoring environment GUI including a plurality of objects and a plurality of free-space pins according to some embodiments of the disclosure.

FIG. 9 illustrates an example view 900 of an authoring environment GUI including a plurality of objects and a plurality of free-space pins according to some embodiments of the disclosure. Authoring environment GUI can be displayed on an electronic device (e.g., similar to device 100 or 200) including, but not limited to, portable or non-portable computing devices such as a tablet computing device, laptop computing device or desktop computing device. View 900 illustrates a three dimensional (3D) environment in a first mode of operation (e.g., a scene editing mode). For example, FIG. 9 includes objects 902A-902D represented as cubes. It should be understood that the cubes are representative and one or more different objects (e.g., 1D, 2D or 3D objects) can be included in the 3D environment. Additionally, it should be understood that the 3D environment (or 3D object) described herein may be a representation of a 3D environment (or 3D object) displayed in a two dimensional (2D) context (e.g., displayed on a 2D screen). In some embodiments, the 3D environment can display gridlines (as shown) or other indicators to assist a content creator with placement and/or size of an object in the 3D environment.

View 900 also illustrates a plurality of free-space pins 910A-910D represented by points at particular coordinates in free space, without being anchored to any object. As shown in view 900, the GUI can optionally display a manipulator anchored to a free-space pin when that pin is selected to enable transformations of one or more objects temporarily associated with that pin (and/or to define a reference point of one or more actions or behaviors to be performed by the object). For example, view 900 shows manipulator 912A anchored to free-space pin 910C. Manipulators can be moved around to different locations within the 3D environment. For example, when a different object or free-space pin is selected, the manipulator can be relocated and displayed anchored to that selected free-space pin or object. For example, selection of free-space pin 910A can be accompanied by the display of manipulator 912B anchored to free-space pin 910A. In some embodiments, when a free-space pin is selected, a single manipulator is displayed corresponding to the selected free-space pin, and the manipulator is no longer displayed with respect to any other free-space pin. However, in other embodiments, multiple manipulators may persist in the scene at the same time.

The manipulator, such as manipulator 912A, can include, in some embodiments, a ring and three arrows (shown as cones in FIG. 9), although other representations of manipulators are contemplated. In some embodiments, when one or more objects are temporarily associated with a particular free-space pin, actuating or translating one of the arrows of the manipulator for that free-space pin can result in movement of the temporarily associated objects along the corresponding axis. In some embodiments, clicking inside the ring of the manipulator for that free-space pin and translating can result in movement of the temporarily associated objects along the plane defined by the ring. Additionally, rotating the ring (e.g., using a click-and-drag operation) can rotate the selected objects around the free-space pin, so that the selected objects can appear to orbit the free-space pin. Pulling the ring perpendicular to plane of the ring can scale the temporarily associated objects (up or down depending on the direction). Thus, the ring/arrows of the manipulator of a free-space pin can provide for 3D translation, rotation and scaling of objects temporarily associated with that free-space pin in the 3D environment. It should be understood that free-space pins can also be used for content authoring in other contexts aside from the CGR scene context (e.g., for any computer generated graphics).

Figure 10:
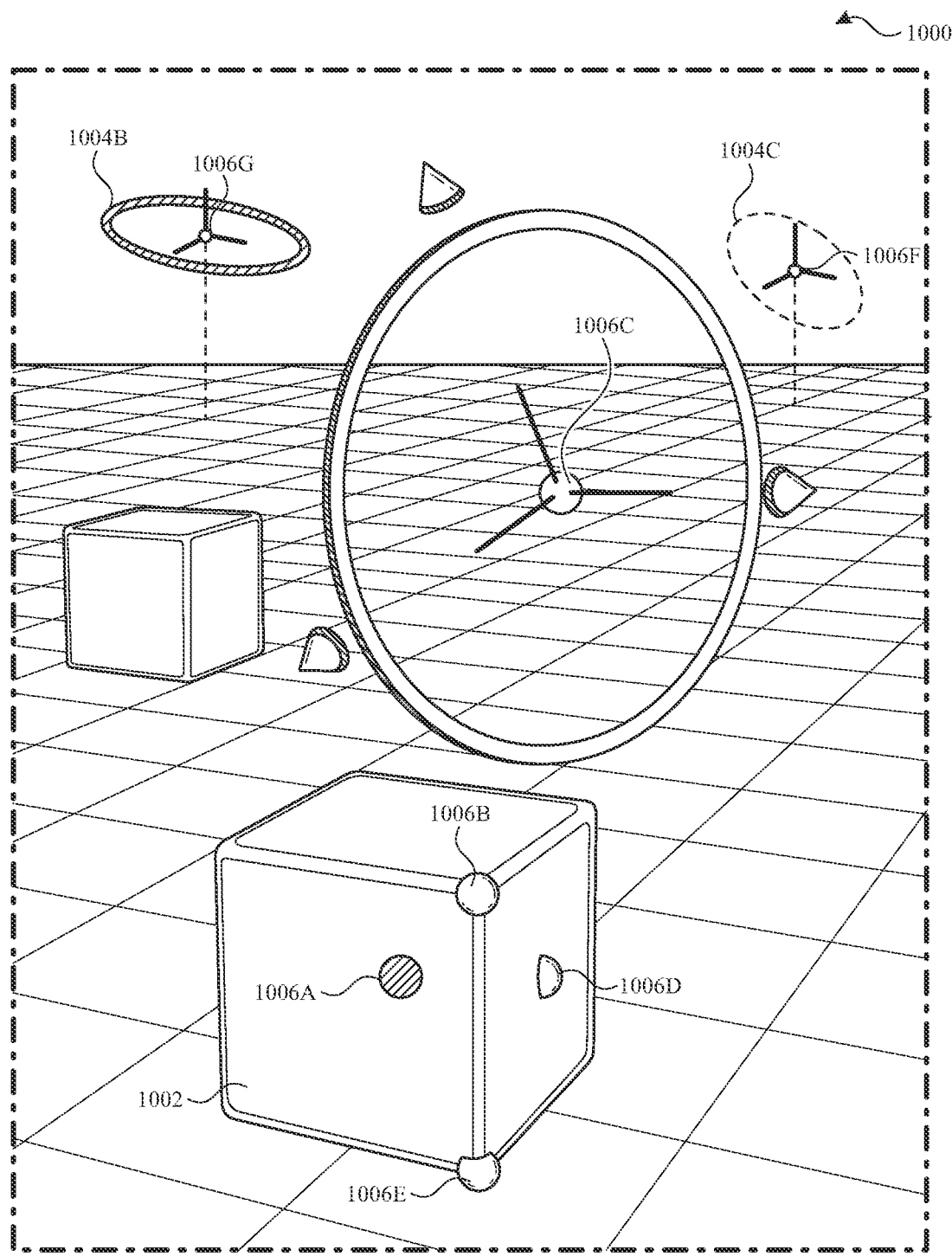
FIG. 10 illustrates an example view of an authoring environment GUI including an object associated with multiple pins, and also multiple free-space pins not bookmarked with any objects according to some embodiments of the disclosure.

FIG. 10 illustrates an example view 1000 of an authoring environment GUI including an object associated with multiple pins, and also multiple free-space pins not bookmarked with any objects according to some embodiments of the disclosure. View 1000 illustrates a second mode of operation (e.g., a pin editing mode), different from the first mode of operation (e.g., the scene editing mode). In particular, FIG. 10 illustrates an object 1002 (e.g., corresponding to object 902A in FIG. 9) including multiple bookmarked pins 1006A-1006E, and two free-space pins 1006F and 1006G. Object 1002 and its bookmarked pins are similar to objects and pins discussed hereinabove, and will not be described here. It should understood that in different embodiments, different numbers of free-space pins (more or fewer) and different placements of free-space pins are possible.

As shown in view 1000, a selected free-space pin 1006G can be displayed along with a manipulator 1004B in the authoring environment GUI. In some embodiments, each free-space pin illustrated in view 1000 can have the same appearance. In some embodiments, one or more free-space pins can look different from other free-space pins, or from other object pins (e.g., a different size, shape, color, shading, etc.). In some embodiments, one or more free-space pins (originally included with the scene) may have a different appearance (e.g., different size, shape, color, shading, etc.) than free-space pins subsequently added in the authoring environment GUI. In some embodiments, a selected free-space pin 1006G and/or its manipulator 1004B may have a different appearance from other unselected free-space pins (e.g., 1006F). In some embodiments, the selected free-space pin can be highlighted or otherwise different in appearance (e.g., different size, shape, color, shading, etc.).

As mentioned above, view 900 illustrates a view of the 3D environment in a first mode of operation (e.g., scene editing mode) and view 1000 illustrates a view of the 3D environment in a second, different mode of operation (e.g., pin editing mode). In some embodiments, free-space pins are displayed in the pin editing mode (e.g., as shown in FIG. 10) but are not displayed in the scene editing mode (as shown in FIG. 9). In some embodiments, the appearance of the manipulator for a free-space pin can be different in the different modes of operation (e.g., different size, shape, color, shading, etc.). For example, FIG. 10 illustrates manipulator 1004B in pin editing mode having a different appearance than the manipulator 912A in the scene editing mode (e.g., a different color, shading, etc.). Additionally or alternatively, an outline around the manipulator ring can have a different appearance (e.g., different color, shading, etc.) in pin editing mode than in scene editing mode. Additionally or alternatively, manipulator 1004B in pin editing mode can include axes lines within the manipulator ring indicative of the local orientation of the free-space pin in the 3D environment, whereas manipulator 912A may not display axes lines. In the example of FIG. 10, free-space pin 1006F can have a manipulator 1004C that is not oriented to one of the X, Y, or Z axes in the scene, but rather is oriented at an angle with respect to those axes. Thus, although free-space pins are associated within only a point in free space, they can nevertheless have an orientation as indicated by their manipulator.

Figure 11:
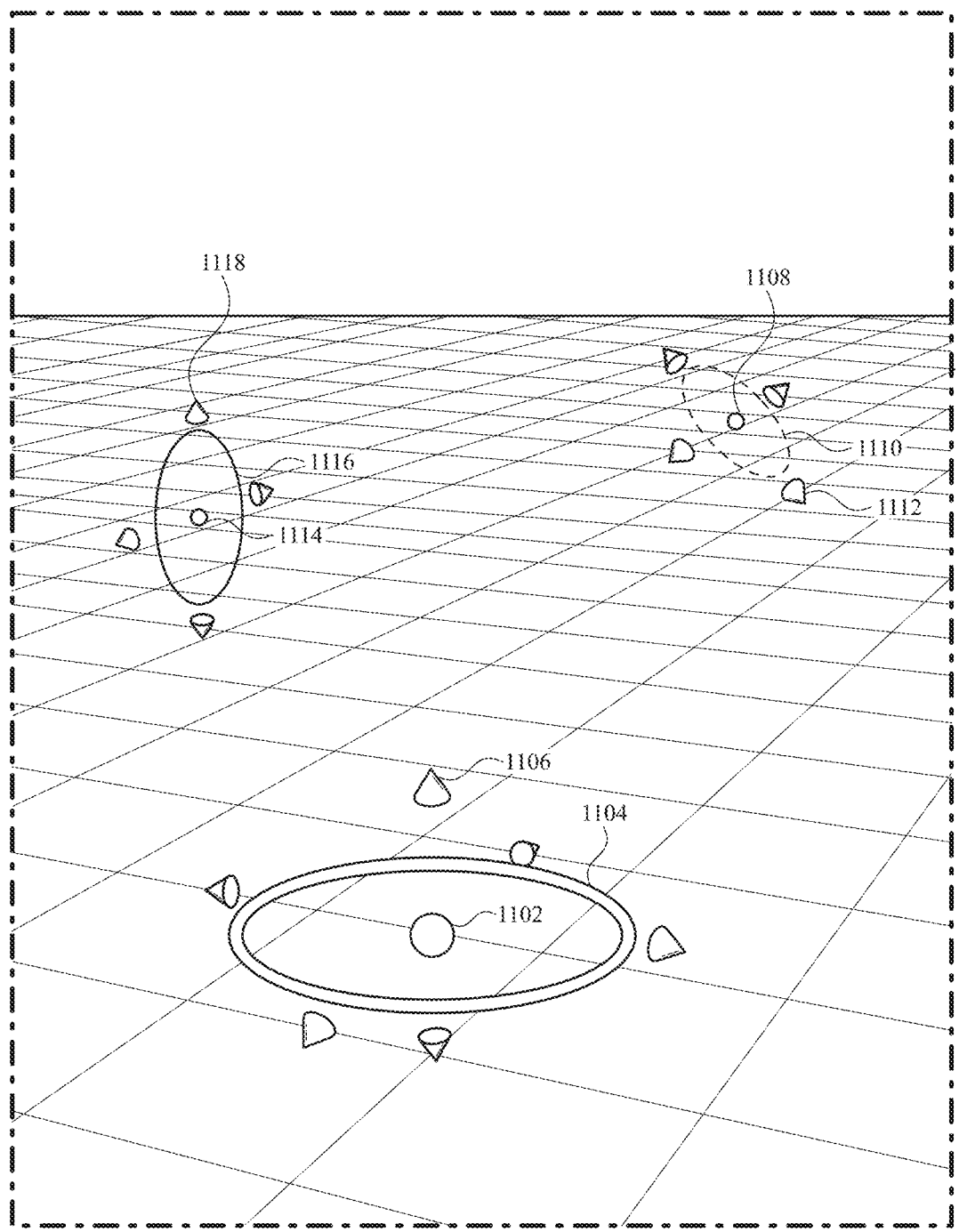
FIG. 11 illustrates example free-space pins in a 3D environment in a first mode of operation (e.g., a scene editing mode) according to some embodiments of the disclosure.

FIG. 11 illustrates example free-space pins in a 3D environment in a first mode of operation (e.g., a scene editing mode) according to some embodiments of the disclosure. Free-space pin 1102 is shown with manipulator ring 1104 and arrows 1106, free-space pin 1108 is shown with manipulator ring 1110 and arrows 1112, and free-space pin 1114 is shown with manipulator ring 1116 and arrows 1118.

In some embodiments, the authoring environment GUI provides for selecting different free-space pins in the scene. Selecting among the different free-space pins enables a user to quickly transition to different locations to provide a temporary locus of manipulation during scene editing mode and/or can enable a user to define a reference point for an action or behavior of one or more objects. For example, a user can quickly transition from manipulator 1104 anchored to free-space pin 1102 to manipulator 1110 or 1116 anchored to free-space pins 1108 and 1114 (or another free-space pin or an object pin) to provide a different, temporary locus that can be used for rotating, scaling or translating temporarily associated objects (among other possible actions) without having to manually move the manipulator between these different positions (which would be more time-consuming). For example, selecting free-space pin 1102 and using manipulator 1104 for rotation can cause pin 1102 to serve as a locus of rotation (e.g., a center of rotation or an axis of rotation) such that one or more objects temporarily associated with free-space pin 1102 rotate along the X-Y plane with respect to pin 1102. In a similar manner, selecting free-space pins 1108 or 1114, respectively, and using manipulator 1110 or 1116, respectively, can cause free-space pins 1108 or 1114, respectively, to serve as a temporary locus of rotation (e.g., a center of rotation or an axis of rotation) such that one or more objects temporarily associated with free-space pins 1108 or 1114 rotate with respect to pins 1108 or 1114, respectively. In other words, a first manipulator of a first free-space pin can have a first locus of rotation and a second manipulator of a second free-space pin (different from the first free-space pin) can have a second locus of rotation (different from the first locus of rotation).

In some embodiments, switching between free-space pins can be achieved using an input in a list of free-space pins. In some embodiments, a tap gesture on a touch screen or a mouse click on one of the free-space pins in the list of free-space pins can be used to select a pin from the list of free-space pins. In some embodiments, the tap gesture or mouse click on a free-space pin can toggle from scene editing mode to pin editing mode. A tap and hold gesture (long press) on a touch screen or a mouse click in combination with a shortcut key (control key, shift key, alt key, command key, windows key, function key, etc.) on one of the pins in the list of free-space pins can select the pin. It should be understood that these embodiments are exemplary and other input options are available. In some embodiments, a keyboard shortcut can be used to toggle between free-space pins without need for input to a touch screen/touch pad or mouse.

Figure 12:
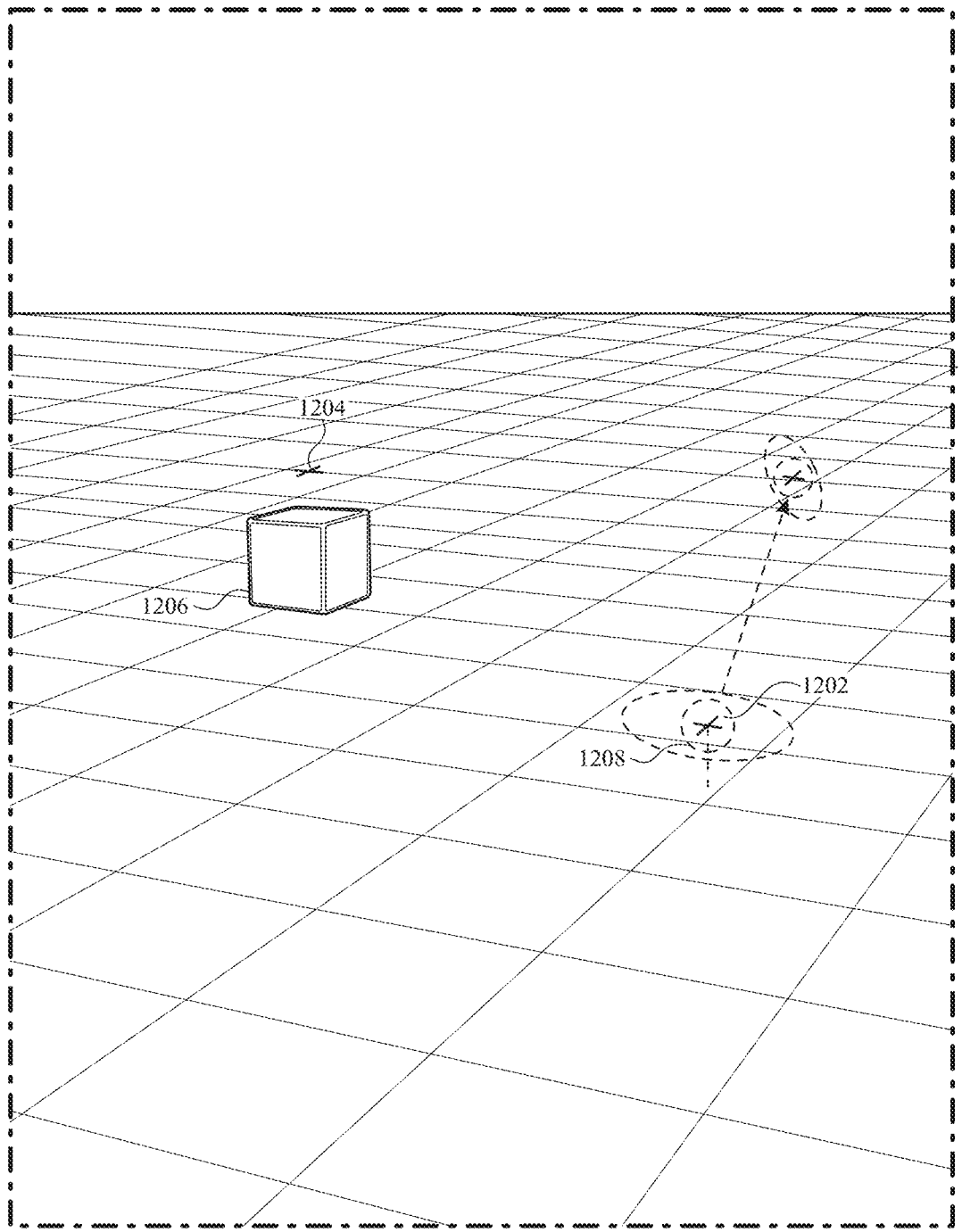
FIG. 12 illustrates example free-space pins in a 3D environment in a second mode of operation (e.g., a pin editing mode) according to some embodiments of the disclosure.

FIG. 12 illustrates example free-space pins in a 3D environment in the second mode of operation (e.g., the pin editing mode) according to some embodiments of the disclosure. In some embodiments, free-space pins can be set at one or more default locations upon creation of a new 3D environment. In some embodiments, one or more free-space pins can be added to an existing 3D environment in the authoring environment GUI. For example, in response to an input to add a free-space pin to an existing 3D environment, one or more free-space targets can be displayed within the 3D environment at predetermined locations. In FIG. 12, free-space target 1202 can be displayed at a location of the 3D environment with no objects nearby, under the presumption that the user may want a manipulator in that location. In other examples, free-space target 1204 can be displayed near object 1206, under the presumption that the user may want a manipulator in that location that is not bookmarked with the object and is therefore capable of temporarily manipulating other objects from that location. In some embodiments, each of the free-space targets are discrete visual elements placed at discrete locations around the 3D environment. In some embodiments, free-space targets have a plus-sign shape. In some embodiments, free-space targets can be any other shape (e.g., rectangular, square, triangular, circular, oval, etc.).

Actuating one of the free-space targets (e.g., by tapping or clicking, etc.) can cause a new free-space pin to replace the actuated target. In some embodiments, actuating one of the free-space targets can additionally cease the display of the remaining free-space targets. In some embodiments, the free-space targets can remain displayed to enable adding multiple free-space pins by actuating other free-space targets, until other input is received (e.g., input to move or otherwise modify a pin or to exit the pin editing mode, etc.). It should be understood that the use of free-space targets for adding free-space pins is an example and adding free-space pins can be done in alternative ways in other embodiments. For example, a user input can add a free-space pin at a location (and optionally with an orientation) specified by the user, specified by the content authoring application, or at random in the 3D environment.

In some embodiments, after placing free-space pin 1208 (e.g., by actuating free-space target 1202), free-space pin 1208 can be modified. For example, free-space pin 1208 can be moved to a different position and/or the orientation of pin 1208 can be changed. For example, an input can be received to move free-space pin 1208 from its initial position to a new position using the ring/arrows of its free-space manipulator in pin editing mode. Additionally or alternatively, an input can be received to change an orientation of free-space pin 1208 from its original orientation to define a new local orientation relative to the axes of the 3D environment (e.g., using the ring of its anchored free-space manipulator in pin editing mode). FIG. 12 illustrates free-space pin 1208 moved from its initial position to a new position in the 3D environment and with a new orientation relative to the axes of the 3D environment. The position and/or the local orientation can be stored for the free-space pin and can be recalled when the pin is selected for use as a temporary locus in scene editing mode.

In some embodiments, a free-space pin can be duplicated in the 3D environment to add a new free-space pin. The duplicate free-space pin(s) can each have the same set of properties (e.g., same orientation, etc.). The duplicate free-space pin(s) can then be modified to adjust other properties (e.g., different location in the environment).

As described herein, the authoring environment GUI can include information about free-space pin properties. The free-space pin properties can include location information of the free-space pin, orientation information, and objects temporarily associated with the free-space pin (and/or objects performing action or behaviors with a reference point defined by the free-space pin). In some embodiments, the information can be represented in a free-space pin properties pane (or other window). In some embodiments, the free-space pin properties pane can be displayed concurrently with the 3D environment.

Figure 13:
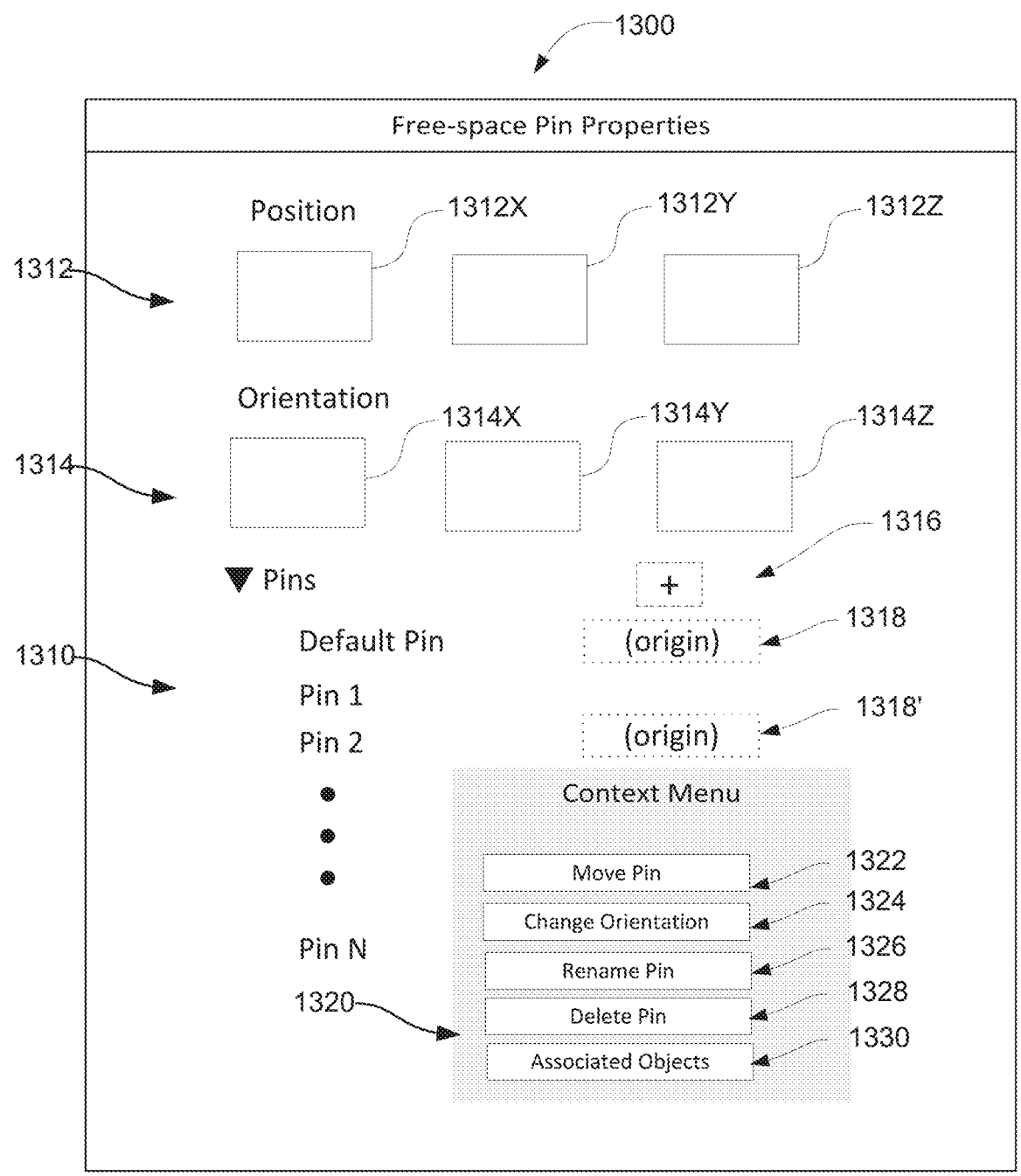
FIG. 13 illustrates an example free-space pin properties pane according to some embodiments of the disclosure.

FIG. 13 illustrates an example free-space pin properties pane 1300 according to some embodiments of the disclosure. In some embodiments, free-space pin properties pane 1300 includes a list 1310 of free-space pins in the 3D environment. In some embodiments, free-space pin properties pane 1300 includes a representation 1312 of position. In some embodiments, representation 1312 of position can include 3D coordinates including an X coordinate 1312X, Y coordinate 1312Y and Z coordinate 1312Z. In either pin editing mode or scene editing mode, position can represent the position of a selected free-space pin in the scene (e.g., relative to the scene origin). In some embodiments, free-space pin properties pane 1300 includes a representation 1314 of orientation. In some embodiments, representation 1314 of orientation can include 3D coordinates including an X coordinate 1314X, Y coordinate 1314Y and Z coordinate 1314Z. In either pin editing mode or scene editing mode, representation 1314 of orientation can represent the local orientation of a selected free-space pin in the 3D environment relative to the axes of the 3D environment. The manipulator anchored to a free-space pin can be located at the position 1312 shown in free-space pin properties pane 1300 and/or oriented according to the orientation 1314 shown in the free-space pin properties pane.

List 1310 of free-space pins can show the free-space pins located in the 3D environment. In some embodiments, an input to select one of the free-space pins (e.g., tap, or clicking or other input) can invoke a context menu 1320 including user interface elements 1322-1330 (e.g., buttons) to perform actions associated with the free-space pin. The actions can include, in some embodiments, moving a free-space pin (to change the position of the selected free-space pin), changing the orientation of a free-space pin, renaming a free-space pin and/or deleting a free-space pin, temporarily associating or de-associating objects with that free-space pin, and/or defining one or more actions or behaviors to be performed by the object with reference to the free-space pin. It should be understood that more, fewer and/or different actions are possible than the examples illustrated in FIG. 13.

For example, after displaying context menu 1320, an input to actuate (e.g., tap, click, etc.) user interface element 1322 can be used to change the location of the respective free-space pin (e.g., as illustrated, for example, in FIG. 12 by the movement of free-space pin 1202 from one location to another. An input to actuate (e.g., tap, click, etc.) user interface element 1324 can be used to change the orientation of the respective free-space pin (e.g., as illustrated, for example, in FIG. 12 by the change in orientation of free-space pin 1202 as it moves from one location to another. An input to actuate (e.g., tap, click, etc.) user interface element 1326 can be used to rename the respective free-space pin. Renaming the free-space pin can change the name of the free-space pin appearing in list 1310 from a generic name (e.g., pin [number]) to a more meaningful name. As a result, the free-space pin can provide, for example, contextual information about the location, orientation and/or purpose of the free-space pin for reference, as opposed to referencing the free-space pins more generically (e.g., by number). An input to actuate (e.g., tap, click, etc.) user interface element 1328 can be used to delete the respective free-space pin. Deleting the free-space pin can remove the free-space pin from list 1310. For example, the free-space pin may be useful for a content creator designing certain types of scenes, but may be unnecessary for downstream or other users. Removing these free-space pins can reduce the number of free-space pins where such pins are unneeded, reducing clutter on the user interface and making it easier to switch between the necessary free-space pins.

An input to actuate (e.g., tap, click, etc.) user interface element 1330 can be used to temporarily associate or de-associate objects with the respective free-space pin. In some embodiments, actuating user interface element 1330 can bring up a sub-context menu showing a list of objects in the 3D environment that can be toggled or otherwise selected/unselected to create temporary associations or to de-associate an object with the free-space pin (and/or to define/un-define a reference point of one or more actions or behaviors to be performed by the object). In some embodiments, the sub-context menu can include a user interface element to globally temporarily associate or de-associate all objects in the list, which may be useful when the free-space pin is needed for a one-time manipulation for all or a selected number of objects.

Free-space pin properties pane 1300 can include a user interface element 1316 for adding free-space pins to the list of free-space pins. In some embodiments, actuating user interface element 1316 can trigger pin editing mode and the display of targets as shown in FIG. 12. In some embodiments, actuating user interface element 1316 can place a free-space pin in the 3D environment (in a random location or as defined by the authoring environment GUI) or request input coordinates for placement of the free-space pin and/or request input coordinates for the local orientation of the free-space pin. In some embodiments, the location and/or orientation coordinates can be entered in representation 1312 of the position and/or representation 1314 of the orientation. In some embodiments, actuating user interface element 1316 can also expand list 1310 if the list is collapsed.

As described above, in some embodiments, the authoring environment GUI can transition from the scene editing mode to the pin editing mode in response to actuating user interface element 1316. In some embodiments, selecting a free-space pin in list 1310 (e.g., by tap, click, etc.) can also transition the authoring environment GUI from the scene editing mode to the pin editing mode. In some embodiments, the authoring environment GUI can transition from the scene editing mode to the pin editing mode via a menu, toggle or shortcut, among other possibilities. In some embodiments, the transition from pin editing mode to scene editing mode can be achieved via a menu, toggle or shortcut among other possibilities. In some embodiments, the transition from pin editing mode to scene editing mode can be achieved by selecting one of the free-space pins in the 3D environment (e.g., the selected free-space pin or another free-space pin). In some embodiments, the transition from pin editing mode to scene editing mode can be achieved by collapsing list 1310.

Figure 14A:
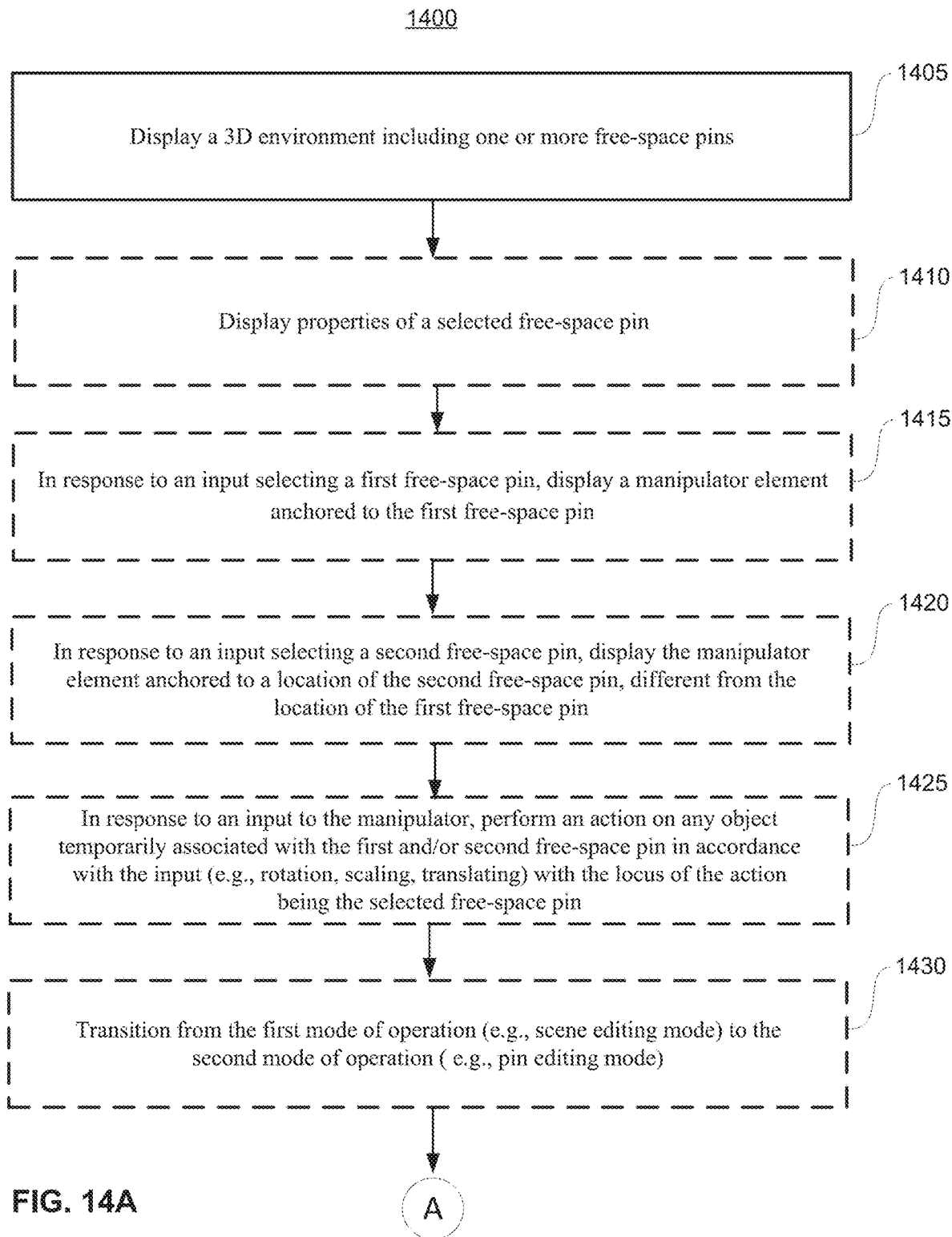
FIGS. 14A-14B illustrate a flow diagram illustrating a process for a user interface (e.g., an authoring environment GUI) including free-space pins in accordance with some embodiments of the disclosure.
Figure 14B:
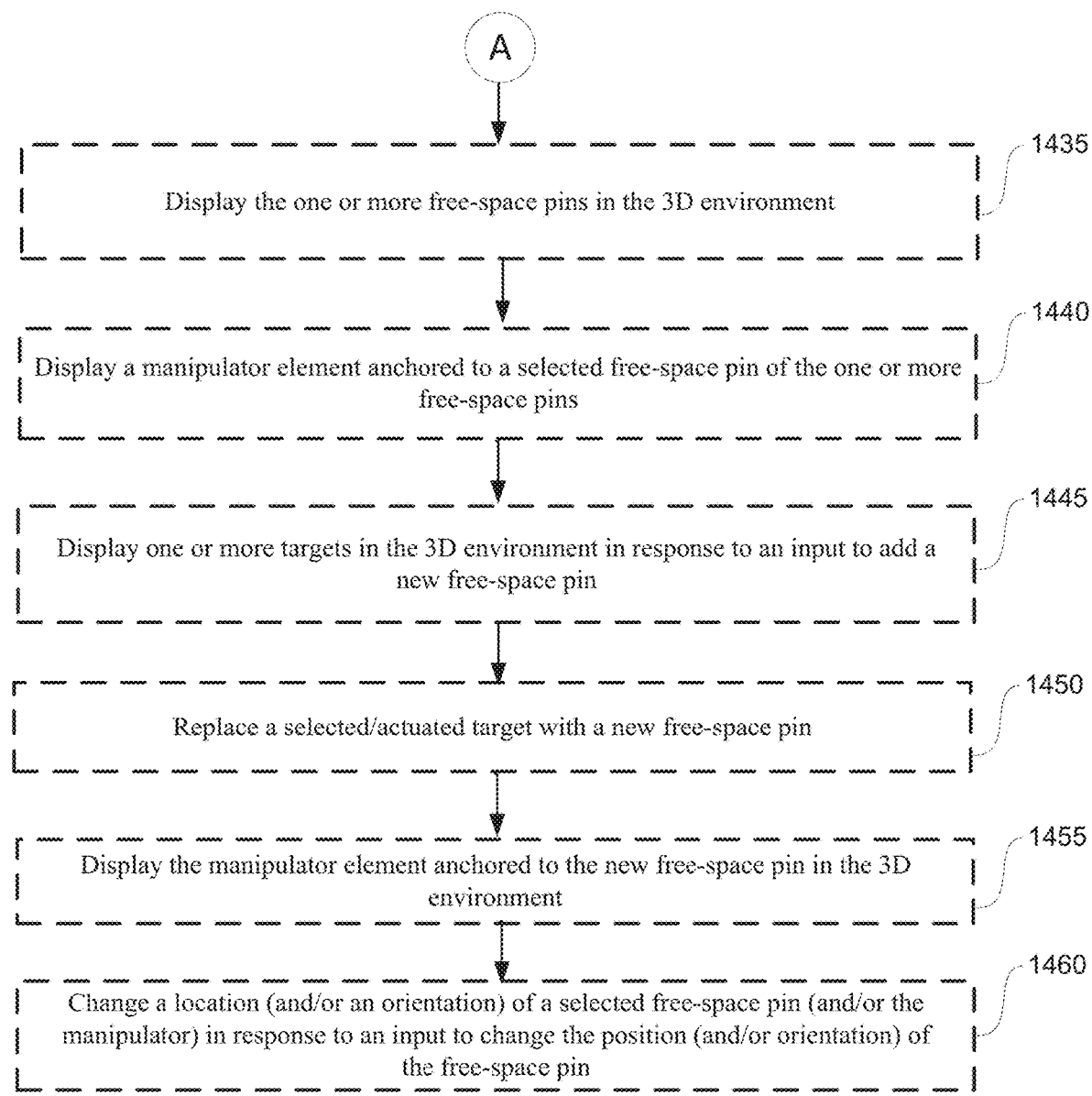

FIGS. 14A-14B illustrate a flow diagram illustrating a process 1400 for a user interface (e.g., an authoring environment GUI) including free-space pins in accordance with some embodiments of the disclosure. Process 1400 includes, at 1405, displaying a representation of a 3D environment including one or more free-space pins. The one or more free-space pins are selectable to display a manipulator element corresponding to a selected free-space pin. In some embodiments, process 1400 optionally includes displaying (e.g., concurrently with the 3D environment), at 1410, free-space pin properties (e.g., in a pane in the GUI) including one or more properties of a selected free-space pin. In some embodiments, the free-space pin properties displayed can include location and/or orientation information, or objects associated with the free-space pin.

In some embodiments, the appearance of the free-space pins (and/or manipulator) in the display depends on a mode of operation such that the appearance is different in a first mode of operation (e.g., a scene editing mode) and in a second mode of operation (e.g., a pin editing mode). For example, in a scene editing mode, the one or more free-space pins may not be displayed, but a manipulator anchored to a selected or default free-space pin may be displayed. For example, at 1415, in response to an input selecting a first free-space pin (or reselecting a first free-space pin, or optionally upon exiting the pin editing mode), process 1400 can include displaying a manipulator element anchored to the first free-space pin. In some embodiments, selecting (or re-selecting) a free-space pin can cause objects associated with that free-space pin to be highlighted or otherwise distinguished from other objects. At 1420, in response to an input selecting a second free-space pin (different from the first free-space pin), process 1400 can include displaying the manipulator element anchored to a location of the second free-space pin, different from the location of the first free-space pin. Thus, selecting a different free-space pin can shift the manipulator to a different locus (e.g., ceasing to display the manipulator at the location of the first free-space pin). At 1425, in response to an input to the manipulator (whether displayed at the location of the first free-space pin or at the location of the second free-space pin), process 1400 can include performing an action on any object temporarily associated with the first and/or second free-space pin in accordance with the input (e.g., rotation, scaling, translating) with the locus of the action being the selected free-space pin.

Process 1400 can include, at 1430, transitioning from the first mode of operation (e.g., scene editing mode) to the second mode of operation (e.g., pin editing mode). In some embodiments, transitioning between the modes can be triggered by selection of a free-space pin or by an input to add a free-space pin to the 3D environment. In pin editing mode, in some embodiments, process 1400 includes, at 1435, displaying the one or more free-space pins in the 3D environment. Additionally or alternatively, process 1400 includes, at 1440, displaying a manipulator element anchored to a selected free-space pin of the one or more free-space pins. The appearance of the manipulator element in the pin editing mode is different from an appearance of the manipulator element in the scene editing mode, in some embodiments.

The one or more free-space pins in a 3D environment can be modified. The modifications can include adding free-space pins, deleting free-space pins, moving free-space pins, changing the orientation of free-space pins, renaming free-space pins, and associating or de-associating objects with free-space pins (e.g., as a temporary locus of manipulation or defining a reference point for one or more actions by the object). In some embodiments, at 1445, the process can further include displaying one or more targets in the 3D environment in response to an input to add a new free-space pin. In some embodiments, at 1450, the process 1400 can further include replacing a selected/actuated target with a new free-space pin (and optionally the new free-space pin can be added to a representation of the one or more free-space pins) in response to selecting/actuating the target. In some embodiments, at 1455, process 1400 can include displaying the manipulator element anchored to the new free-space pin in the 3D environment. In some embodiments, at 1460, process 1400 can further include changing a location (and/or an orientation) of a selected free-space pin (and/or the manipulator) in response to an input to change the position (and/or orientation) of the free-space pin.

It is understood that process 1400 is an example and that more, fewer, or different operations can be performed in the same or in a different order. Additionally, the operations in process 1400 described above are, optionally, implemented by running one or more functional modules in an information processing apparatus such as general-purpose processors (e.g., as described with respect to FIG. 2) or application specific chips, and/or by other components of FIG. 2.

In some embodiments, associating multiple objects with the same free-space pin can allow for simultaneous manipulation of the multiple objects and/or defining a reference point for one or more actions by the multiple objects via the shared free-space pin. For example, referring back to FIG. 9, objects 902A-902D can be temporarily associated with free-space pin 910C. A manipulator can be displayed anchored to free-space pin 910C, and input to the manipulator can result in transformation for each of the temporarily associated objects for that free-space pin (without requiring independent manipulators and inputs to perform the same transformation to each of the objects individually). For example, while objects 902A-902D are temporarily associated with free-space pin 910C, a manipulator 912A can be displayed anchored to the free-space pin. A rotation input to manipulator 912A can result in rotation of each of objects 902A-902D about free-space pin 910C. In some examples, the manipulator can be moved to a different free-space pin as a temporary locus of action for objects temporarily associated with that different free-space pin. In some embodiments, the same behavior (manipulation of multiple temporarily associated objects using a free-space pin and/or performing one or more actions by one or more objects with reference to the free-space pin) can be simultaneously achieved for temporarily selected objects of different types. For example, each of objects 902A-902D can be different objects, but when they are all temporarily associated with the same free-space pin, they can perform a common action (e.g., rotation, turning the head, lifting a hand, etc.) using the free-space pin as a locus for the action via input to a manipulator anchored to that free-space pin.

Figure 15A:
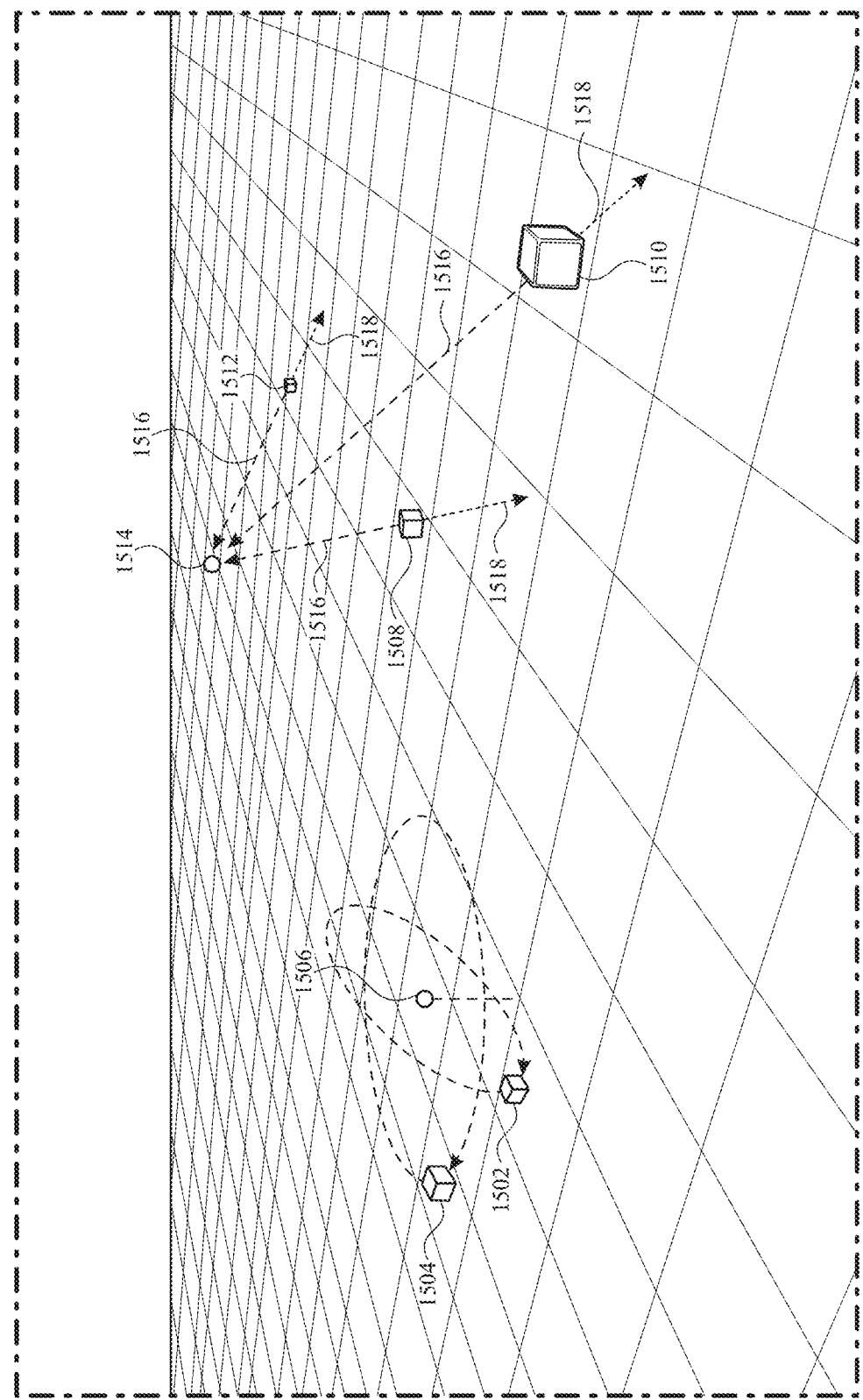
FIGS. 15A-15B illustrate some example object manipulations that are possible with free-space pins according to some embodiments of the disclosure.
Figure 15B:
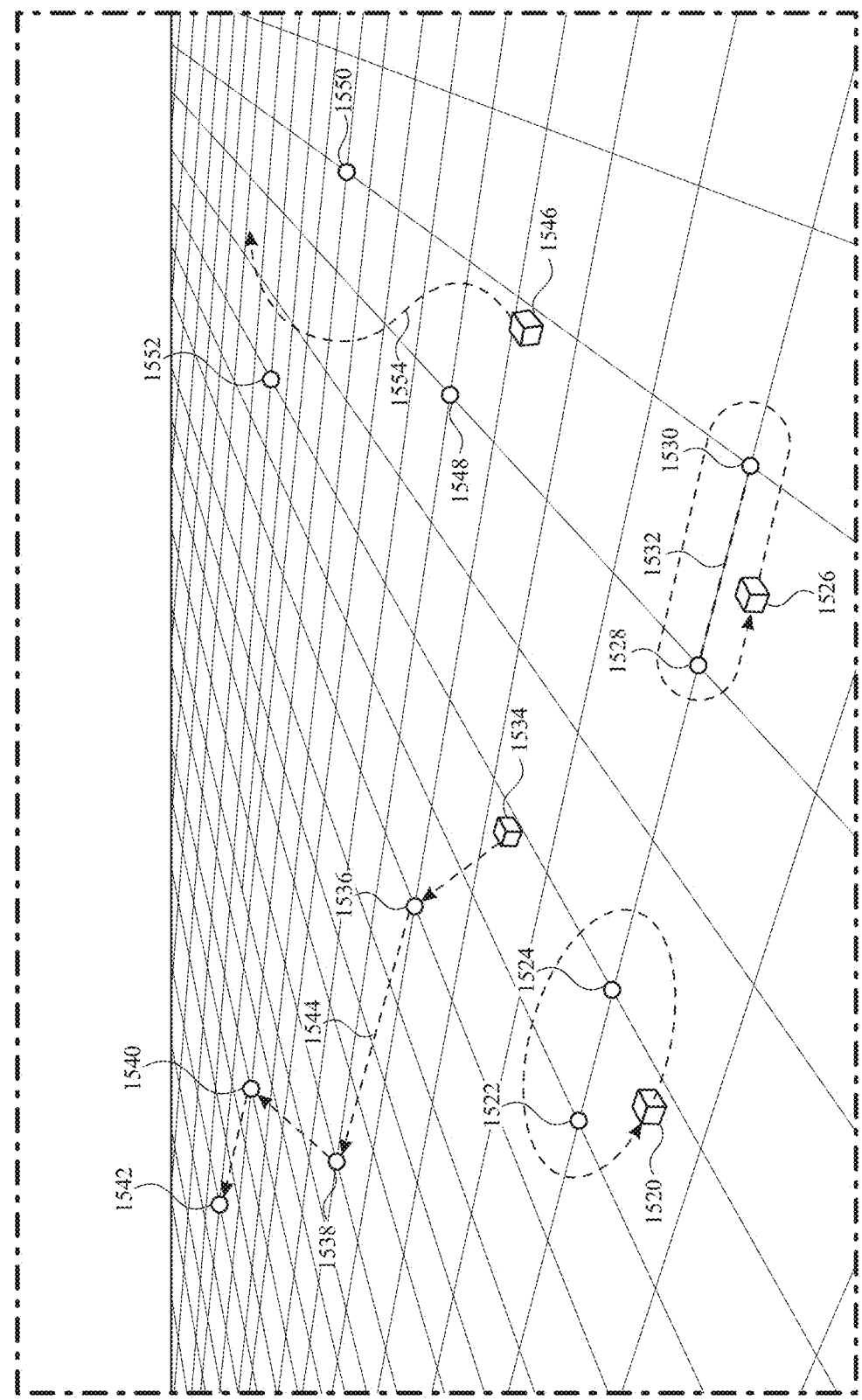

FIGS. 15A-15B illustrate some example object manipulations that are possible with free-space pins according to some embodiments of the disclosure. For simplicity of illustration, objects in FIGS. 15A-15B are shown as small cubes, and free-space pins are shown without manipulators.

FIG. 15A illustrates some example object manipulations that are possible using a single free-space pin according to some embodiments of the disclosure. The object manipulations can be actions or behaviors of the one or more objects with respect to a reference point defined by the free-space pin. In FIG. 15A, objects 1502 and 1504 temporarily associated with free-space pin 1506 are shown rotating or orbiting the free-space pin, maintaining equidistant spacing with respect to free-space pin (e.g., the free-space pin defines the center of the orbit). In another embodiment, objects 1508, 1510 and 1512 temporarily associated with free-space pin 1514 are shown moving toward the free-space pin as indicated by arrows 1516, creating object movement simulating an attraction or gravitational pull (e.g., the free-space pin defines the target of attraction/pull). Objects 1508, 1510 and 1512 are also shown alternatively moving away from the free-space pin 1514 as indicated by arrows 1518, creating object movement simulating a repulsion effect. In some embodiments, object sizes or other properties can be scaled up or down as the objects move closer or farther away from free-space pin 1514. It should be understood that the manipulations of FIG. 15A are examples only and are in no way limiting, and other manipulations are contemplated in accordance with any number of mathematical and geometric relationships between the objects and the single free-space pin, including relationships between the objects themselves and the single free-space pin.

FIG. 15B illustrates some example object manipulations that are possible using multiple free-space pins according to some embodiments of the disclosure. In FIG. 15B, object 1520 temporarily associated with free space pins 1522 and 1524 moves such that the sum of the distances from the object and the two pins is constant, creating elliptical movement (e.g., the object movement action is defined with respect to two reference points corresponding to the free-space pins). In another embodiment, object 1526 temporarily associated with free-space pins 1528 and 1530 moves to remain equidistant from a line segment 1532 between the free-space pins. In another embodiment, object 1534 can be temporarily associated with free-space pins 1536, 1538, 1540 and 1542 in sequence, and attractive movement can be employed to create a directed pathway 1544 for the object. In another embodiment, object 1546 can be temporarily associated with free space pins 1548, 1550 and 1552, and spacing rules can be established such that the object must maintain a certain distance from the free space pins during subsequent object manipulations 1554. This embodiment may be useful when there is a need to save room for the addition of future objects. It should be understood that the manipulations of FIG. 15B are examples only and in no way limiting, and other manipulations are contemplated in accordance with any number of mathematical and geometric relationships between the objects and multiple free-space pins, including relationships between the objects themselves and the multiple free-space pins.

Therefore, according to the above, some examples of the disclosure are directed to a method comprising, at an electronic device in communication with a display generation component (e.g., a display), displaying, using the display generation component, a computer graphics editing environment including an affordance representing a first free-space pin. The method further comprises, while displaying the affordance representing the first free-space pin, receiving input representing selection of the first free-space pin. The method further comprises, after receiving the input representing selection of the first free-space pin, manipulating a location or orientation of an object associated with the first free-space pin using a location of the first free-space pin as a reference point for the manipulation. Additionally or alternatively to one or more of the examples discussed above, in some examples the method further comprises manipulating the location of the object by moving the object toward the location of the first free-space pin. Additionally or alternatively to one or more of the examples discussed above, in some examples the method further comprises manipulating the orientation of the object by orbiting the object around the location of the first free-space pin. Additionally or alternatively to one or more of the examples discussed above, in some examples manipulating the location of the object associated with the first free-space pin comprises manipulating the object in accordance with a predetermined locational relationship between the object and the first free-space pin. Additionally or alternatively to one or more of the examples discussed above, in some examples the method further comprises, while displaying the affordance representing the first free-space pin, displaying, using the display generation component, an affordance representing a second free-space pin. The method further comprises, while displaying the affordance representing the second free-space pin, receiving input representing selection of the second free-space pin along with the first free-space pin. The method further comprises, after receiving the inputs representing selection of the first free-space pin and the second free-space pin, manipulating the object in accordance with a predetermined locational relationship between two or more of the object, the first free-space pin, and the second free-space pin. Additionally or alternatively to one or more of the examples discussed above, in some examples the method further comprises manipulating the object by maintaining a sum of a distance between the object and the first free-space pin and a distance between the object and the second free-space pin as a constant value. Additionally or alternatively to one or more of the examples discussed above, in some examples the method further comprises, at the electronic device in communication with the display generation component, associating the object with the first free-space pin. The method further comprises, after receiving the input representing selection of the first free-space pin, displaying, using the display generation component, an affordance representing a first manipulator anchored to the first free-space pin. The method further comprises, while displaying the first manipulator, manipulating the object associated with the first free-space pin using the first manipulator. Additionally or alternatively to one or more of the examples discussed above, in some examples the method further comprises, at the electronic device in communication with the display generation component, while displaying the first manipulator, receiving input representing manipulation of the first manipulator. The method further comprises, after receiving the input representing manipulation of the first manipulator, manipulating the object associated with the first free-space pin. Additionally or alternatively to one or more of the examples discussed above, in some examples the method further comprises, at the electronic device in communication with the display generation component, after displaying the affordance representing the first manipulator anchored to the first free-space pin, receiving input representing selection of a second free-space pin. The method further comprises, after receiving the input representing selection of the second free-space pin, displaying, using the display generation component, an affordance representing a second manipulator anchored to the second free-space pin. The method further comprises, while displaying the second manipulator, receiving input representing manipulation of an object associated with the second free-space pin using the second manipulator. Additionally or alternatively to one or more of the examples discussed above, in some examples the method further comprises, while displaying the second manipulator, ceasing to display the first manipulator. Additionally or alternatively to one or more of the examples discussed above, in some examples the method further comprises simultaneously manipulating a plurality of objects associated with the selected first free-space pin. Additionally or alternatively to one or more of the examples discussed above, in some examples the first free-space pin is unanchored to any objects in the computer graphics editing environment. Additionally or alternatively to one or more of the examples discussed above, in some examples the method further comprises displaying, using the display generation component, an affordance representing a free-space pin properties pane including one or more properties of each of a plurality of free-space pins in the computer graphics editing environment. Additionally or alternatively to one or more of the examples discussed above, in some examples the one or more properties includes a representation of a 3D location of each of the plurality of free-space pins. Additionally or alternatively to one or more of the examples discussed above, in some examples the one or more properties includes a representation of an orientation of each of the one or more free-space pins. Additionally or alternatively to one or more of the examples discussed above, in some examples the method further comprises, at the electronic device in communication with the display generation component, receiving input representing addition of a second free-space pin to the computer graphics editing environment. The method further comprises, after receiving the input representing the addition of the second free-space pin, adding the second free-space pin to the computer graphics editing environment. Additionally or alternatively to one or more of the examples discussed above, in some examples the method further comprises displaying, using the display generation component, an affordance for adding a free-space pin, wherein receiving the input representing the addition of the second free-space pin comprises actuating the affordance for adding the free-space pin. Additionally or alternatively to one or more of the examples discussed above, in some examples the method further comprises, in response to actuating the affordance for adding the free-space pin, displaying in the computer graphics editing environment an affordance representing a target, wherein the input representing the addition of the second free-space pin further comprises receiving input representing selection of the target. Additionally or alternatively to one or more of the examples discussed above, in some examples manipulating the location or orientation of the object associated with the first free-space pin comprises utilizing an orientation of the first free-space pin in performing the manipulation. Additionally or alternatively to one or more of the examples discussed above, in some examples manipulating the location or orientation of the object associated with the first free-space pin comprises scaling one or more properties of the one or more objects. Additionally or alternatively to one or more of the examples discussed above, in some examples a non-transitory computer-readable storage medium stores instructions, which when executed by one or more processors, cause the one or more processors to perform a method of any of the examples discussed above. Additionally or alternatively to one or more of the examples discussed above, in some examples an electronic device comprises one or more processors, memory, and one or more programs, wherein the one or more programs are stored in the memory and configured to be executed by the one or more processors, the one or more programs including instructions for performing a method of any of the examples discussed above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:
  at an electronic device in communication with a display:
    displaying, using the display, a computer graphics editing environment including an affordance representing a first free-space pin, wherein the affordance representing the first free-space pin is displayed anchored at a location in the computer graphics editing environment and at a distance from an object, and not anchored to the object;
    while displaying the affordance representing the first free-space pin, receiving an input representing selection of the first free-space pin;
    after receiving the input representing the selection of the first free-space pin, manipulating a location or orientation of the object associated with the first free-space pin using the location of the affordance representing the first free-space pin as a reference point for the manipulation, wherein the affordance representing the first free-space pin remains anchored at the location in the computer graphics editing environment during the manipulating of the location or orientation of the object, wherein the object has a first location when the manipulation of the object is complete; and
    continuing displaying the first free-space pin anchored at the location in the computer graphics editing environment after disassociating the object from the first free-space pin, wherein the object is disassociated from the first free-space pin and has the first location while continuing displaying the first free-space pin anchored at the location in the computer graphics editing environment after disassociating the object from the first free-space pin.

2. The method of claim 1, further comprising manipulating the location of the object by moving the object toward the location of the first free-space pin.

3. The method of claim 1, further comprising manipulating the orientation of the object by orbiting the object around the location of the first free-space pin.

4. The method of claim 1, wherein manipulating the location of the object associated with the first free-space pin comprises manipulating the object in accordance with a predetermined locational relationship between the object and the first free-space pin.

5. The method of claim 1, further comprising:
  while displaying the affordance representing the first free-space pin, displaying, using the display, an affordance representing a second free-space pin, and while displaying the affordance representing the second free-space pin, receiving an input representing selection of the second free-space pin along with the first free-space pin; and
  after receiving the input representing the selection of the first free-space pin and the input representing the selection of the second free-space pin, manipulating the object in accordance with a predetermined locational relationship between two or more of the object, the first free-space pin, and the second free-space pin.

6. The method of claim 5, further comprising manipulating the object by maintaining a sum of a distance between the object and the first free-space pin and a distance between the object and the second free-space pin as a constant value.

7. The method of claim 1, further comprising:
  associating the object with the first free-space pin;
  after receiving the input representing the selection of the first free-space pin, displaying, using the display, an affordance representing a first manipulator anchored to the first free-space pin; and
  while displaying the first manipulator, manipulating the object associated with the first free-space pin using the first manipulator.

8. The method of claim 7, further comprising:
while displaying the first manipulator, receiving an input representing manipulation of the first manipulator; and
after receiving the input representing the manipulation of the first manipulator, manipulating the object associated with the first free-space pin.

9. The method of claim 7, further comprising:
after displaying the affordance representing the first manipulator anchored to the first free-space pin, receiving an input representing selection of a second free-space pin;
after receiving the input representing the selection of the second free-space pin, displaying, using the display, an affordance representing a second manipulator anchored to the second free-space pin; and
while displaying the second manipulator, receiving an input representing manipulation of the object associated with the second free-space pin using the second manipulator.

10. The method of claim 9, further comprising:
while displaying the second manipulator, ceasing to display the first manipulator.

11. The method of claim 1, further comprising simultaneously manipulating a plurality of objects associated with the selected first free-space pin.

12. The method of claim 1, wherein the first free-space pin is unanchored to any objects in the computer graphics editing environment.

13. The method of claim 1, further comprising:
displaying, using the display, an affordance representing a free-space pin properties pane including one or more properties of each free-space pin of a plurality of free-space pins in the computer graphics editing environment.

14. The method of claim 13, wherein the one or more properties includes a representation of a 3D location of each free-space pin of the plurality of free-space pins.

15. The method of claim 13, wherein the one or more properties includes a representation of an orientation of each free-space pin of the plurality of free-space pins.

16. The method of claim 1, further comprising:
receiving an input representing addition of a second free-space pin to the computer graphics editing environment; and
after receiving the input representing the addition of the second free-space pin, adding the second free-space pin to the computer graphics editing environment.

17. The method of claim 16, further comprising:
displaying, using the display, an affordance for adding a free-space pin;
wherein receiving the input representing the addition of the second free-space pin comprises actuating the affordance for adding the free-space pin.

18. The method of claim 17, further comprising:
in response to actuating the affordance for adding the free-space pin, displaying in the computer graphics editing environment an affordance representing a target, wherein receiving the input representing the addition of the second free-space pin further comprises receiving an input representing selection of the target.

19. The method of claim 1, wherein manipulating the location or orientation of the object associated with the first free-space pin comprises utilizing an orientation of the first free-space pin in performing the manipulation.

20. The method of claim 1, wherein manipulating the location or orientation of the object associated with the first free-space pin comprises scaling one or more properties of the object associated with the first free-space pin.

21. The method of claim 1, further comprising:
after receiving the input representing the selection of the first free-space pin:
displaying a context menu including at least a first user interface element that is selectable to perform a first action associated with the first free-space pin.

22. A non-transitory computer-readable storage medium storing instructions, which when executed by one or more processors, cause the one or more processors to:
display, using a display, a computer graphics editing environment including an affordance representing a first free-space pin;
while displaying the affordance representing the first free-space pin:
receive a first input representing selection of the first free-space pin; and
receive a second input associating an object with the first free-space pin, wherein in response to the second input, the first free-space pin is associated with a plurality of objects that includes the object; and
after receiving the first input representing the selection of the first free-space pin:
simultaneously manipulate a location or orientation of the plurality of objects associated with the first free-space pin using a location of the first free-space pin as a reference point for the manipulation, wherein the simultaneous manipulation includes:
simultaneously manipulating:
the object in a first direction or first orientation relative to the location of the first free-space pin, and
a second object of the plurality of objects, different from the object, in a second direction or second orientation different from the first direction or first orientation; and
remove the object from association with the first free-space pin while maintaining the location of the first free-space pin.

23. An electronic device comprising:
one or more processors;
memory; and
one or more programs, wherein the one or more programs are stored in the memory and configured to be executed by the one or more processors, the one or more programs including instructions for:
displaying, using a display, a computer graphics editing environment including an affordance representing a first free-space pin, wherein the affordance representing the first free-space pin is displayed anchored at a location in the computer graphics editing environment and at a distance from an object, and not anchored to the object;
while displaying the affordance representing the first free-space pin, receiving an input representing selection of the first free-space pin;
after receiving the input representing the selection of the first free-space pin, manipulating a location or orientation of the object associated with the first free-space pin using the location of the affordance representing the first free-space pin as a reference point for the manipulation, wherein the affordance representing the first free-space pin remains anchored at the location in the computer graphics editing environment during the manipulating of the location or orientation of the object, wherein the object has a first location when the manipulation is complete; and continuing displaying the first free-space pin anchored at the location in the computer graphics editing environment after disassociating the object from the first free-space pin, wherein the object is disassociated from the first free-space pin and has the first location while continuing displaying the first free-space pin anchored at the location in the computer graphics editing environment after disassociating the object from the first free-space pin.

24. The electronic device of claim 23, wherein the one or more programs include instructions for:

after receiving the input representing the selection of the first free-space pin:

displaying a context menu including at least a first user interface element that is selectable to perform a first action associated with the first free-space pin.

* * * * *